(12) United States Patent
Stephens et al.

(10) Patent No.: US 11,986,990 B2
(45) Date of Patent: *May 21, 2024

(54) WOOD-GRAINED POLYMER SUBSTRATE

(71) Applicant: Tangent Technologies LLC, Aurora, IL (US)

(72) Inventors: Andrew Stephens, Aurora, IL (US); Francisco Morales, Plano, IL (US); Tadeusz Rybka, Streamwood, IL (US)

(73) Assignee: TANGENT TECHNOLOGIES LLC, Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,091

(22) Filed: Oct. 19, 2021

(65) Prior Publication Data

US 2022/0032526 A1 Feb. 3, 2022

Related U.S. Application Data

(63) Continuation of application No. 16/678,400, filed on Nov. 8, 2019, now Pat. No. 11,173,643, which is a
(Continued)

(51) Int. Cl.
*B32B 27/08* (2006.01)
*B29C 48/18* (2019.01)
(Continued)

(52) U.S. Cl.
CPC ............ *B29C 48/695* (2019.02); *B29C 48/18* (2019.02); *B29C 48/49* (2019.02); *B32B 3/263* (2013.01);
(Continued)

(58) Field of Classification Search
CPC ....... B29C 48/695; B29C 48/18; B29C 48/49; B32B 3/263; B32B 27/08; B32B 27/20;
(Continued)

(56) References Cited

U.S. PATENT DOCUMENTS

| D92,186 S | 5/1934 | Little |
|---|---|---|
| 2,142,181 A | 12/1936 | Croce |

(Continued)

FOREIGN PATENT DOCUMENTS

| CN | 3297889 | 5/2003 |
|---|---|---|
| CN | 3616547 | 2/2007 |

(Continued)

OTHER PUBLICATIONS

DeGroot, "Synthetic Decking Roundup," Professional Deck Builder 1-8 (2012).
(Continued)

*Primary Examiner* — Maria V Ewald
*Assistant Examiner* — Daniel P Dillon
(74) *Attorney, Agent, or Firm* — McDermott Will & Emery LLP

(57) ABSTRACT

A wood-grained polymer substrate includes a plurality of layers of different colors. The substrate is formed into elongated boards and used in the production of various end products similar to natural wood. Methods for producing the wood-grained polymer substrate are also provided.

20 Claims, 23 Drawing Sheets

Related U.S. Application Data continuation-in-part of application No. 15/245,948, filed on Aug. 24, 2016, now Pat. No. 10,981,350.

(60) Provisional application No. 62/208,928, filed on Aug. 24, 2015.

(51) Int. Cl.
| | |
|---|---|
| *B29C 48/49* | (2019.01) |
| *B29C 48/695* | (2019.01) |
| *B32B 3/26* | (2006.01) |
| *B32B 27/20* | (2006.01) |
| *B32B 27/32* | (2006.01) |
| *B29K 23/00* | (2006.01) |
| *B29L 31/10* | (2006.01) |

(52) U.S. Cl.
CPC .............. *B32B 27/08* (2013.01); *B32B 27/20* (2013.01); *B32B 27/32* (2013.01); *B29K 2023/065* (2013.01); *B29K 2995/002* (2013.01); *B29L 2031/10* (2013.01); *B32B 2250/24* (2013.01); *B32B 2307/4026* (2013.01); *B32B 2419/00* (2013.01)

(58) Field of Classification Search
CPC .............. B32B 27/32; B32B 2250/24; B32B 2307/4026; B32B 2419/00; B29K 2023/065; B29K 2995/002; B29L 2031/10
USPC ........................................................ 428/151
See application file for complete search history.

(56) References Cited

U.S. PATENT DOCUMENTS

| | | | |
|---|---|---|---|
| 2,332,081 A | 10/1943 | Hunt et al. | |
| 2,632,204 A | 3/1953 | Murray | |
| 3,247,047 A | 4/1966 | Buckley | |
| 3,422,175 A | 1/1969 | Rowland | |
| 3,443,278 A | 5/1969 | Nauta | |
| 3,531,828 A | 10/1970 | Nauta | |
| 3,608,261 A | 9/1971 | French et al. | |
| 3,792,945 A | 2/1974 | Randall | |
| 3,881,984 A | 5/1975 | Soda et al. | |
| 3,920,366 A | 11/1975 | Randall | |
| 4,280,950 A | 7/1981 | Nagata et al. | |
| 4,661,392 A | 4/1987 | Kaostad | |
| D299,793 S | 2/1989 | Yacovella | |
| 4,836,814 A | 6/1989 | Bambara et al. | |
| 5,110,530 A | 5/1992 | Havens | |
| 5,126,088 A | 6/1992 | Andres | |
| 5,232,751 A | 8/1993 | Cameron et al. | |
| 5,866,639 A | 2/1999 | Dorchester et al. | |
| 5,869,138 A | 2/1999 | Nishibori | |
| D428,500 S | 7/2000 | Wederski | |
| 6,083,601 A | 7/2000 | Prince et al. | |
| 6,153,293 A | 11/2000 | Dahl et al. | |
| 6,596,784 B1 | 7/2003 | King | |
| D505,467 S | 5/2005 | Marr | |
| D531,326 S | 10/2006 | Folliard | |
| 7,137,229 B2 | 11/2006 | Pervan | |
| 7,204,944 B2 | 4/2007 | Piedboeuf | |
| 7,410,687 B2 | 8/2008 | Dolinar | |
| 7,507,464 B2 | 3/2009 | Walrath | |
| 7,588,821 B2 | 9/2009 | Horwitz | |
| 7,866,758 B2 | 1/2011 | Jang | |
| D642,287 S | 7/2011 | Poland | |
| D644,340 S | 8/2011 | Canales et al. | |
| D653,779 S | 2/2012 | Damen et al. | |
| D653,780 S | 2/2012 | Metcalf | |
| D659,857 S | 5/2012 | Schober et al. | |
| 8,168,104 B2 | 5/2012 | Han et al. | |
| 8,197,733 B2 | 6/2012 | Sudano | |
| D668,794 S | 10/2012 | Trudel | |
| D671,230 S | 11/2012 | Lee | |
| D678,556 S | 3/2013 | Metcalf | |
| 8,388,331 B2 | 3/2013 | Osada et al. | |
| D710,117 S | 8/2014 | Euna et al. | |
| D732,191 S | 6/2015 | Price et al. | |
| D732,192 S | 6/2015 | Price et al. | |
| D732,193 S | 6/2015 | Price et al. | |
| D732,194 S | 6/2015 | Price et al. | |
| D732,195 S | 6/2015 | Price et al. | |
| D732,197 S | 6/2015 | Price et al. | |
| 9,527,341 B2 | 12/2016 | Rassi et al. | |
| 9,533,444 B2 | 1/2017 | Philpot et al. | |
| D780,333 S | 2/2017 | Davis et al. | |
| D780,335 S | 2/2017 | Davis et al. | |
| D782,070 S | 3/2017 | Metcalf et al. | |
| D784,566 S | 4/2017 | Davis et al. | |
| D786,457 S | 5/2017 | Metcalf | |
| 10,953,686 B2 | 3/2021 | Maesen | |
| 2003/0021915 A1 | 1/2003 | Rohatgi | |
| 2004/0038002 A1 | 2/2004 | Franco et al. | |
| 2007/0104930 A1 | 5/2007 | Grohman | |
| 2008/0299351 A1 | 12/2008 | Buchholtz et al. | |
| 2011/0151193 A1 | 6/2011 | Cantley et al. | |
| 2011/0177291 A1 | 7/2011 | Sudano | |
| 2013/0052395 A1* | 2/2013 | Davis .................... | B32B 27/304 428/424.6 |
| 2013/0224437 A1 | 8/2013 | Park et al. | |
| 2016/0273228 A1 | 9/2016 | Metcalf et al. | |

FOREIGN PATENT DOCUMENTS

| | | |
|---|---|---|
| CN | 3647137 | 5/2007 |
| DE | 1963161 | 6/1971 |
| DE | 2327512 | 12/1973 |
| EP | 0532340 | 3/1993 |
| FR | 2738768 | 12/1999 |
| GB | 1489591 | 10/1977 |
| JP | H07-214631 | 8/1995 |

OTHER PUBLICATIONS

Koepplmayr et al., "Numerical and Experimental Modeling of a Multiflux Static Mixer for Continuous Extrusion of Layered Polymer Blends," 14th European Conference on Mixing, At Warsaw, Poland, (Sep. 2012).

Van der Hoeven et al., "Homogeneity of multilayers produced with a Static Mixer," Polymer Engineering And Science, 41(1): 1-18 (2001).

Thermally Fused Laminate (TFL) Panels (on-line), no date available. Retrieved from Internet Aug. 11, 2017, URL: http://funderamerica.com/productsltfl-panels/ (3 pages).

StaMixCo, "Principles of Operation of Static Mixers," Static Mixer Products & Technology, accessed on the Internet at: https://web.archive.org/web/20081209081624/http://www.stamixco-usa.com:BO/principles-of-operation/default.html (Dec. 9, 2008).

Non-Final Rejection received in corresponding U.S. Appl. No. 15/245,948, dated Jul. 13, 2018.

Final Rejection received in corresponding U.S. Appl. No. 15/245,948, dated Jan. 2, 2019.

Preinterview first office action received in corresponding U.S. Appl. No. 16/678,400, dated May 13, 2020.

First action interview—office action received in corresponding U.S. Appl. No. 16/678,400, dated Oct. 27, 2020.

Final Rejection received in corresponding U.S. Appl. No. 16/678,400, dated Apr. 12, 2021.

* cited by examiner

WOOD-GRAINED POLYMER SUBSTRATE

CROSS-REFERENCE TO RELATED APPLICATIONS

The present application claims the benefit of priority under 35 U.S.C. § 120 as a continuation from U.S. patent application Ser. No. 16/678,400 entitled "Wood-Grained Polymer Substrate," filed on Nov. 8, 2019, which claims the benefit of priority as a continuation-in-part from U.S. patent application Ser. No. 15/245,948 entitled "Wood-Grained Polymer Substrate," filed on Aug. 24, 2016, issued on Apr. 20, 2021 as U.S. Pat. No. 10,981,350, which claims the benefit of U.S. Provisional Patent Application No. 62/208,928, filed Aug. 24, 2015, the disclosures of which are hereby incorporated by reference in their entirety for all purposes.

FIELD OF THE DISCLOSURE

The present disclosure relates to polymer composites and more particularly to polymer composites that are used as a natural wood substitute or replacement.

BACKGROUND

The decking industry has seen numerous introductions of composite and alternative plastic lumber decking products over the past decade. Composite decking typically comprises 50% wood fiber or particles and 50% polyethylene plastic to act as a binder to hold the wood particles together. This entire matrix is extruded into linear deck boards (TREX brand is one example). Due to undesirable qualities of this product, many companies have added a coextruded polymer cap layer around the exterior of the board, which has little or no wood fiber to protect the wood fiber/plastic matrix in the core from exposure and deterioration due to environmental exposure.

In recent years, as composite products have evolved, manufacturers have introduced several colors to the exterior coextruded layer to produce a surface which has varied color tones to emulate natural wood. This wood grain appearance is only skin deep and cutting or planing of the wood composite removes this coextruded cap layer to expose the standard fiber-filled, homogenous core.

The standard plastic extrusion process is designed to evenly mix all ingredients to produce consistent quality of product. Introducing multiple colors at the beginning of the extrusion process results in a homogeneous mixture of a single color. The industry produced multiple color tones by utilizing color concentrates (streaker colors) that have carrier resins that melt at relatively high temperatures. By keeping the temperature zones on the extrusion process at or near the temperatures of the melting point of the streaker colors, the streaker color concentrates would soften but not melt immediately whereby the streaker color concentrates would release color randomly and produce a streak effect.

This effect would produce a short string of color on the surface of the board. However, the streakers only produced a line of color in a single direction, usually along the extrusion direction, and when cut would not create a wood-grain like appearance through a core of the board. For example, in U.S. Pat. App. Pub. No. 2004/0038002, the streak effect shows color variation that starts and stops within a short distance due to the individual color pellet softening, streaking and then being consumed in a discrete area of the board. With the board cut, pockets of color appear on the end surface, but are discontinuous and do not form a wood-grained appearance.

For co-extruded products, streakers would cause a cap layer to have varied color tones on the surface, but the core of the product remains a single color as evident when the board is cut or planed. For example, in U.S. Pat. App. Pub. No. 2011/0177291, streaker pellets are swirled in an extruder to form a "two-dimensional" cap layer for co-extrusion with a foam core. The cap layer has streaks of color at the surface, but is thin and does not extend into the core of the finished product.

Attempts have also been made to produce polymer boards having a wood-grained appearance through a core of the board. For example, in Japanese Patent No. H07-214631, different colored plastics are extruded through concentric rings, and the molten flow becomes turbulent to swirl the colors together. However, the process produces inconsistencies in the finished product due to the turbulent flow of the extrusion, and cutting the board can expose portions having minimal or irregular color patterns, such as breaks or gaps in the lines, presenting similar problems to the streakers discussed above.

Another example is French Patent No. 2,738,768 which illustrates a process for simultaneously extruding plastics of different colors to coalesce them into a single product without mixing together. However, the process has similar deficiencies to that of Japanese Patent No. H07-214631 discussed above. The patterns produced in the processes of these references are not consistent throughout the board, and post processing steps, such as cutting, can produce visible surfaces with undesirable characteristics.

SUMMARY

The present disclosure may comprise one or more of the following features and combinations thereof.

In illustrative embodiments, a high density polyethylene wood-grained substrate includes a plurality of layers of different colors. The substrate is formed into elongated boards which each include a first set of polymer layers formed that include a first colorant. The substrate includes a second set of polymer layers that include a second colorant different than the first colorant. The first and second layers alternate within the substrate to form a wood-grained appearance throughout the entire substrate.

According to certain aspects of the present disclosure, a capped polymer substrate that simulates natural wood is provided. The substrate extends along a first direction and includes a first side and a second side spaced apart from the first side along a second direction that is different than the first direction. The first side and the second side define a width of the substrate and extend along the first direction. The substrate includes a first set of polymer layers extending along the first direction and containing a first colorant. A majority of the first set of polymer layers is substantially continuous along the first direction, the substrate includes a second set of polymer layers extending along the first direction and containing a second colorant different than the first colorant. A majority of the second set of polymer layers is substantially continuous along the first direction. A core extends between the first and the second sides and along the first direction. The core includes a first wood-grained pattern formed of the first set of polymer layers and the second set of polymer layers. The first wood-grained pattern is exposed on outers surface of the core at a first end and a second end of the core, wherein individual layers of the first and the second set of polymer layers are interspersed within the core to form the first wood-grained pattern throughout the core. A plurality of individual layers of one of the first and second sets of polymer layers extend along a substantially uninterrupted curvilinear path in the second direction originating proximate the first side and terminating proximate the second side. A cross-section of the core exposes the first wood-grained pattern. A cap is fused onto cohere surfaces of the core, wherein the cap includes a second wood-grained pattern formed of a copolymer.

In another aspect of the present disclosure, a method of producing a capped polymer substrate that simulates natural wood is provided. The method includes co-extruding a first polymer and a second polymer to form a combined core flow extrusion. The method also includes feeding the combined core flow extrusion through a core flow divider that includes a first plurality of section inserts to form a layered core flow. Each section insert of the first plurality of section inserts is predeterminedly inter-fitted with respect to each other to vary a first wood-grained pattern into the layered core flow, wherein the first wood-grained pattern includes a plurality of core grains oriented in different directions such that individual core grains of the plurality of grains are varied in thickness. The method also includes co-extruding the second polymer and a third polymer to form a combined cap flow extrusion. The method also includes feeding the combined cap flow extrusion through a cap flow divider that includes a second plurality of section inserts to form a layered cap flow. Each section insert of the second plurality of section inserts predeterminedly inter-fitted with to each other to vary a second wood-grained pattern into the layered cap flow. The method also includes receiving the layered core flow at a die to form a core. The method also includes receiving the layered cap flow at the die. The method also includes fusing the layered cap flow to cohere surfaces of the core.

In yet another aspect of the present disclosure, a machine for producing a capped polymer substrate that simulates natural wood is provided. The machine includes a first extruder and a second extruder. A core flow adapter is in communication with the first extruder and the second extruder, wherein the core flow adapter receives a first polymer from the first extruder and a second polymer from the second extruder for co-extruding the first polymer and the second polymer to form a combined core flow extrusion. A core flow divider is in communication with the core flow adapter, wherein the core flow divider receives the combined core flow extrusion from the core flow adapter to form a layered core flow comprising a first wood-grained pattern. The machine also includes a third extruder. A cap flow adapter is in communication with the second extruder and the third extruder, wherein the cap flow adapter receives the second polymer from the second extruder and a third polymer from the third extruder for co-extruding the second polymer and the third polymer to form a combined cap flow extrusion. A cap flow divider is in communication with the cap flow adapter, wherein the cap flow divider receives the combined cap flow extrusion from the cap flow adapter to form a layered cap flow comprising a second wood-grained pattern. A die is in communication with the core flow divider and the cap flow divider, wherein the die receives the layered core flow from the core flow divider and receives the layered cap flow from the cap flow divider for fusing the layered cap flow to the layered core flow These and other features of the present disclosure will become more apparent from the following description of the illustrative embodiments.

DETAILED DESCRIPTION OF THE DRAWINGS

Figure 1:
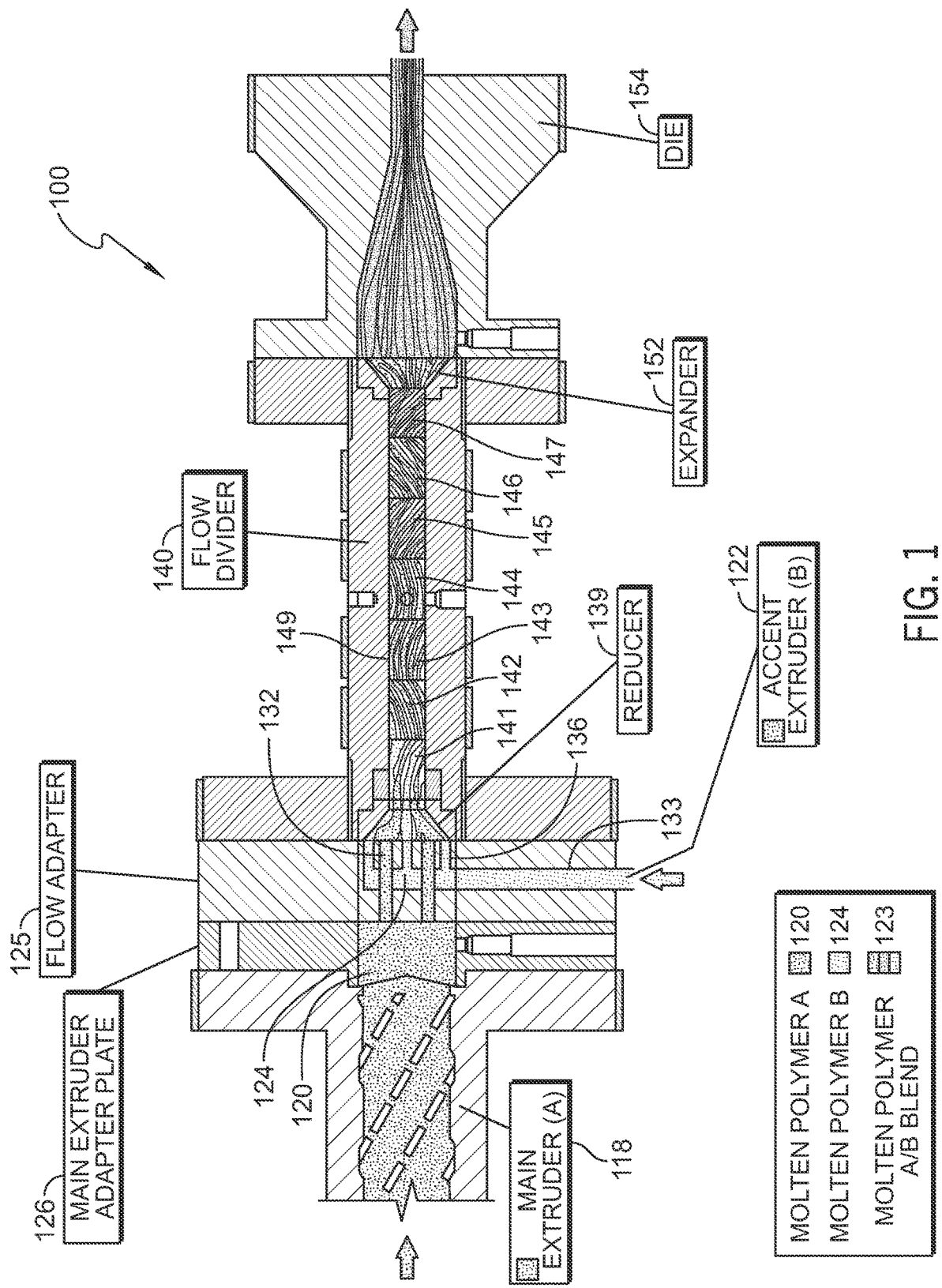
FIG. 1 illustrates a sectional view through an extrusion machine used to manufacture wood-grained polymer substrates of the present disclosure.

For the purposes of promoting an understanding of the principles of the disclosure, reference will now be made to a number of illustrative embodiments illustrated in the drawings and specific language will be used to describe the same.

An illustrative extrusion machine 100 in accordance with the present disclosure is shown in FIG. 1. Extrusion machine 100 is used to form wood-grained polymer substrates 10, 210, as shown in FIGS. 6-11, having varying patterns of simulated wood grain which extend through and along each substrate 10, 210. Substrates 10, 210 can be made from polymer based materials, such as recycled high density polyethylene (HDPE), having at least two different colorants added thereto to define the wood-grain patterns. Polymer substrates 10, 210 can be free of natural wood or other organic fibers. Polymer substrates 10, 210 can include additives, such as UV inhibitors, foaming agents, and color concentrates, to produce polymer substrates having desired colors and material properties, such as durability and strength.

Figure 12:
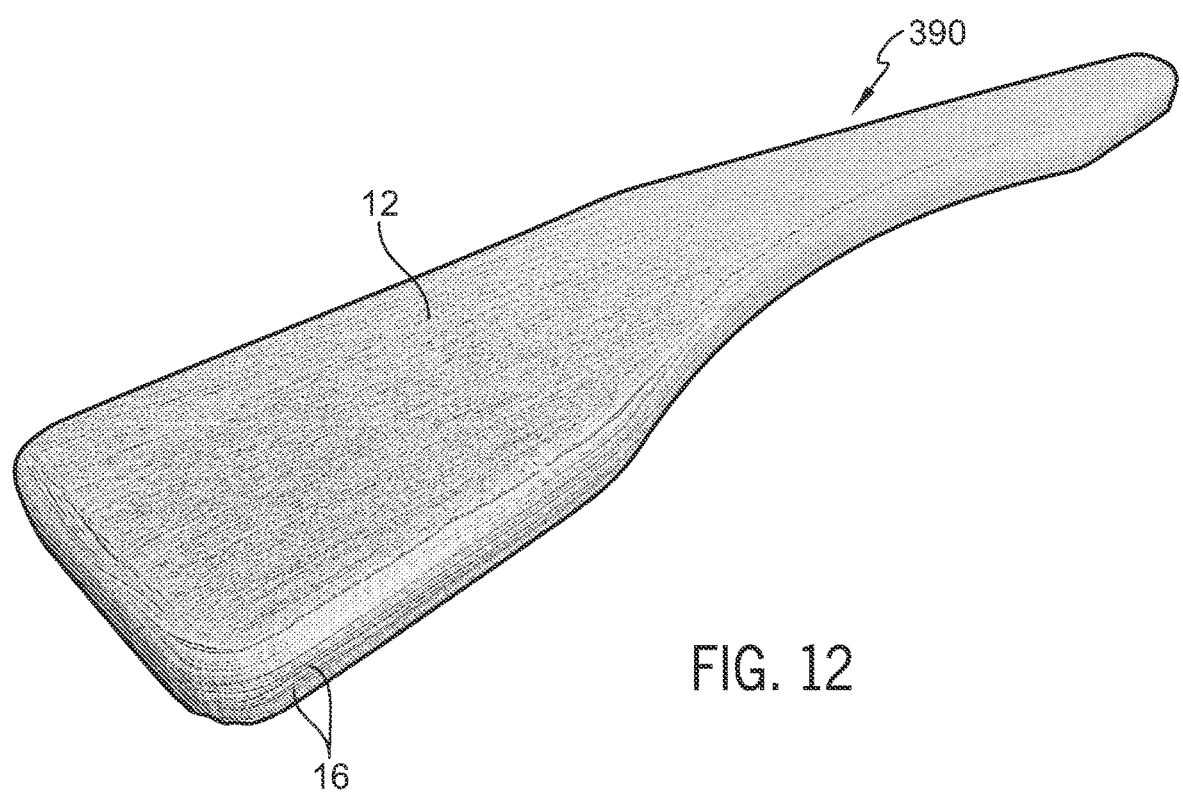
FIG. 12 is a perspective view of one embodiment of an end product formed using a polymer substrate of the present disclosure.
Figure 13:
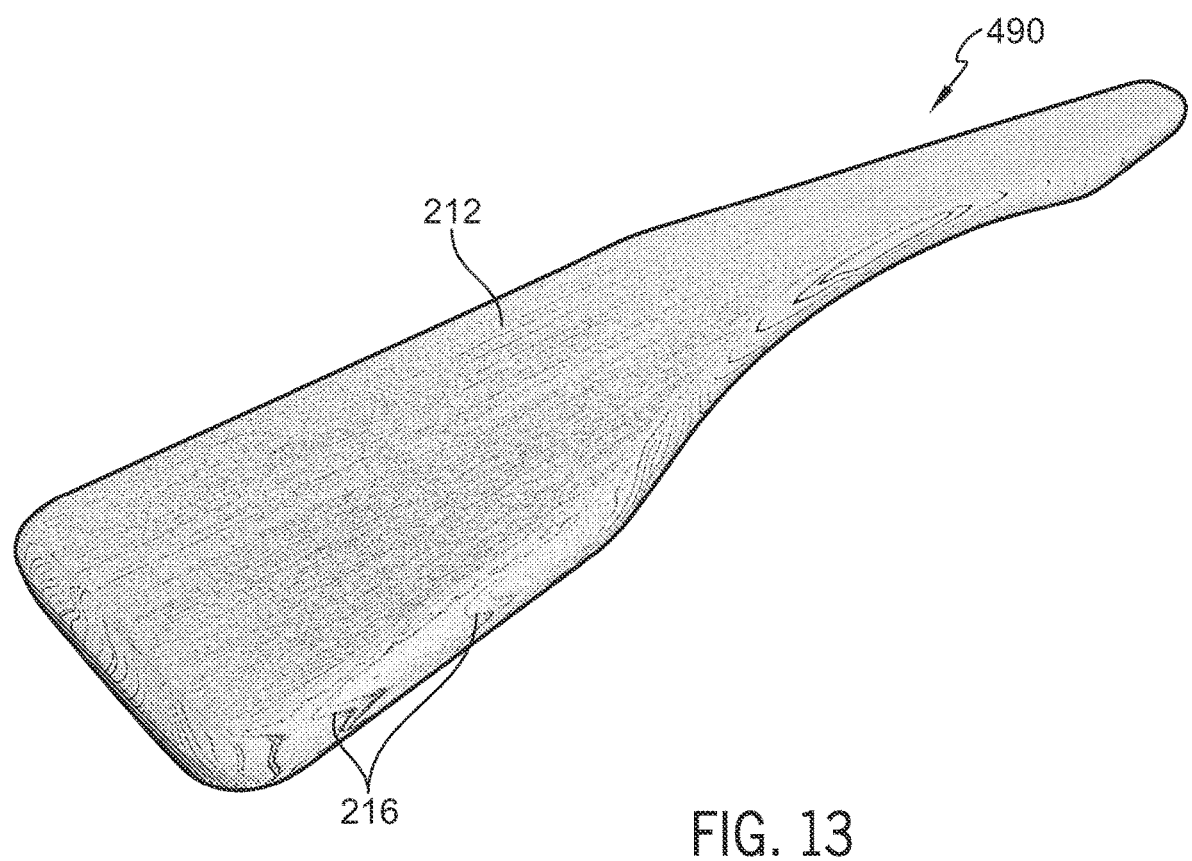
FIG. 13 is a perspective view of another embodiment of an end product formed using a polymer substrate of the present disclosure.

The wood-grained polymer substrates 10, 210 can be post-processed, such as by planing or embossing, and cut to form various sized boards used to make polymer-lumber end products, such as those shown in FIGS. 12 and 13. The boards can be shipped to customers that design and build a multitude of end products, such as furniture, and they can fabricate the end products using the wood-grained polymer boards of the present disclosure just as they typically would using natural wood lumber. Fabrication using the polymer boards could include drilling, routing, and cutting to build multi-component products such as outdoor furniture, including adirondack chairs and park benches for example.

Figure 6:
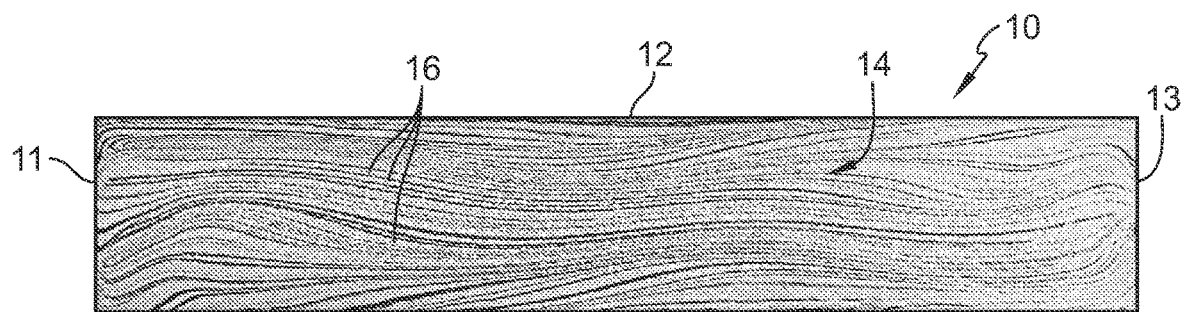
FIG. 6 is sectional view taken through one embodiment of a polymer substrate in accordance with the present disclosure showing a wood grain pattern of the polymer substrate.
Figure 7:
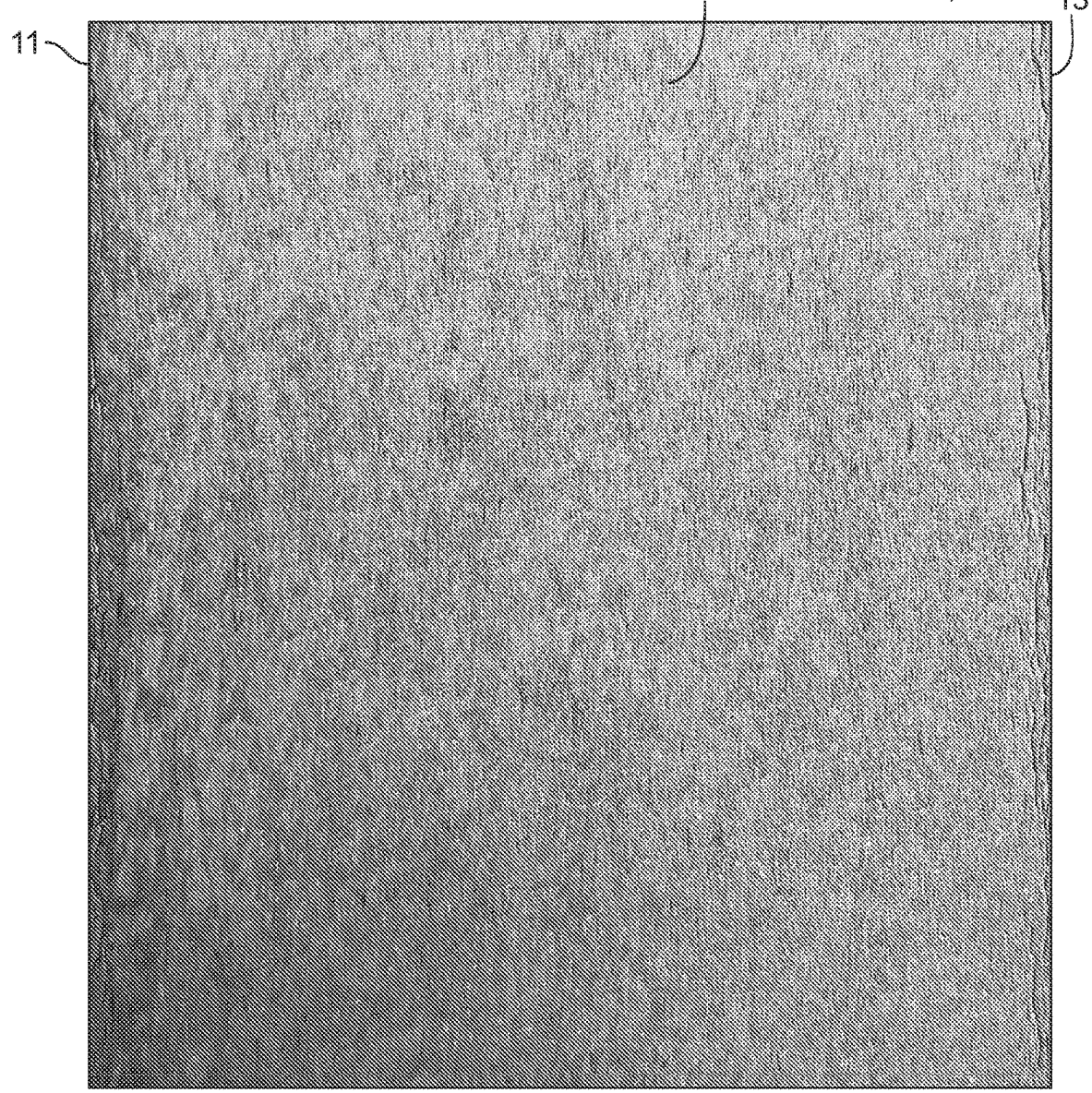
FIG. 7 is a top plan view of the polymer substrate of FIG. 6 showing colorations on a surface of the substrate form the different color polymers.
Figure 8:
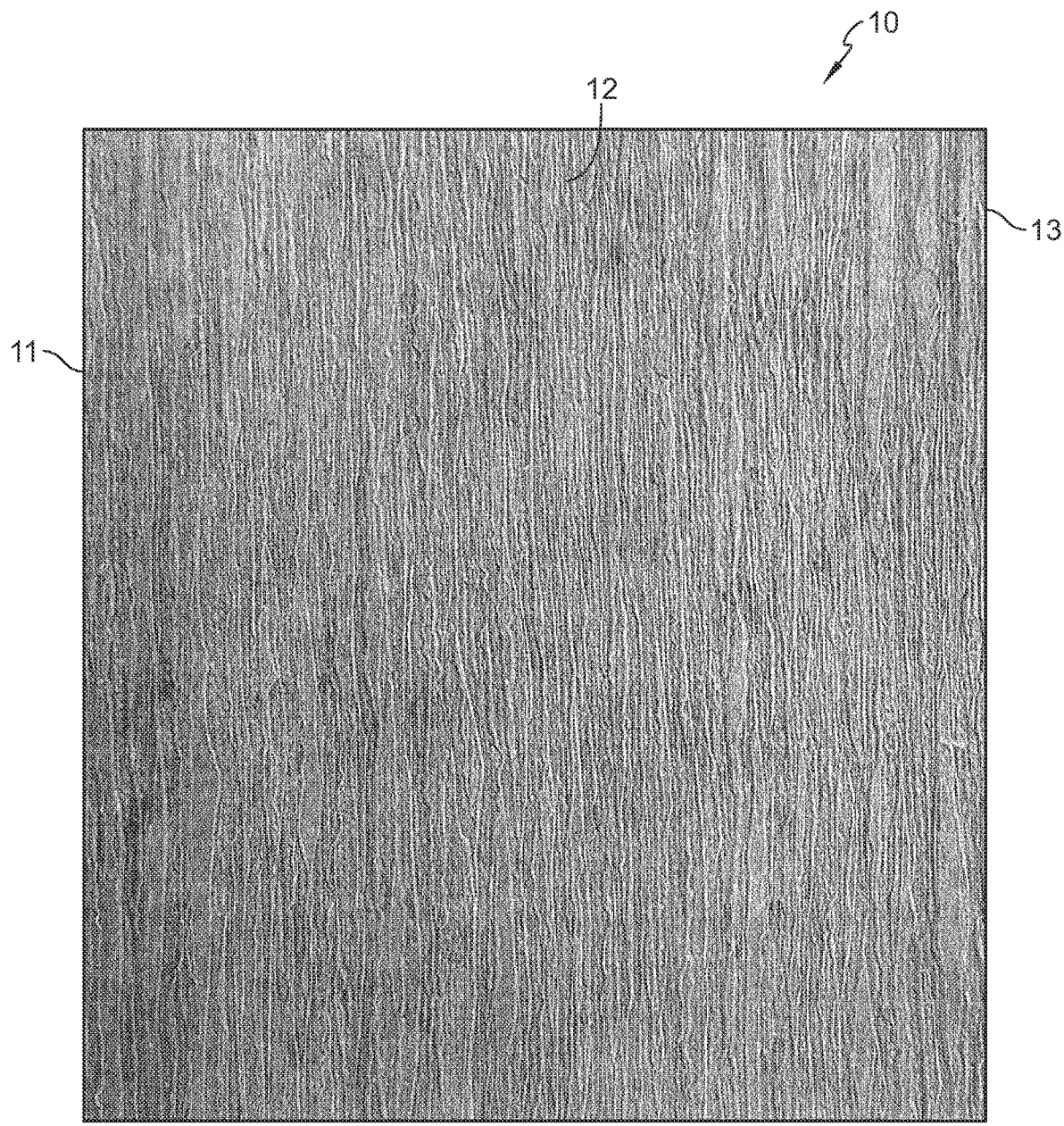
FIG. 8 is a view similar to FIG. 6 showing embossing on an outer surface of the polymer substrate.
Figure 9:
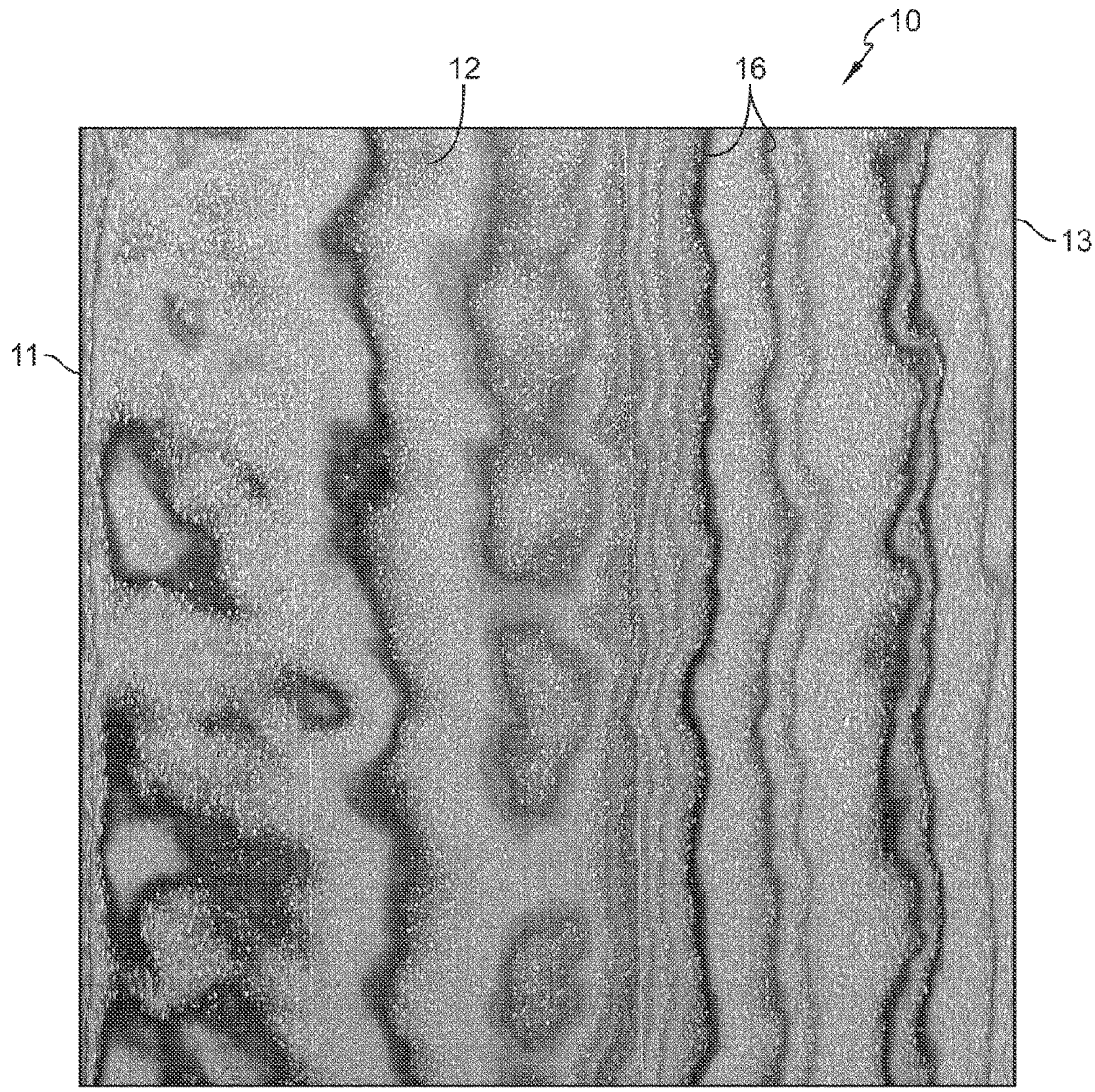
FIG. 9 is a view similar to FIG. 6 showing a wood grain pattern of the polymer substrate after a portion of the outer surface is removed.
Figure 10:
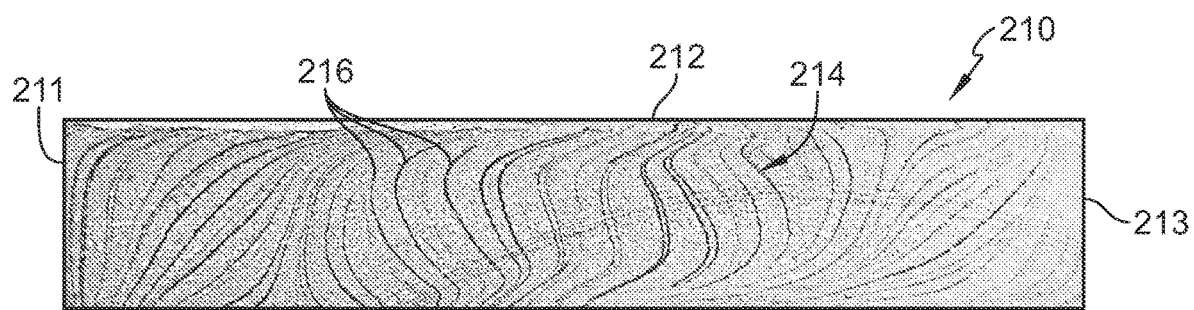
FIG. 10 is sectional view taken through another embodiment of a polymer substrate in accordance with the present disclosure showing a wood grain pattern of the polymer substrate.
Figure 11:
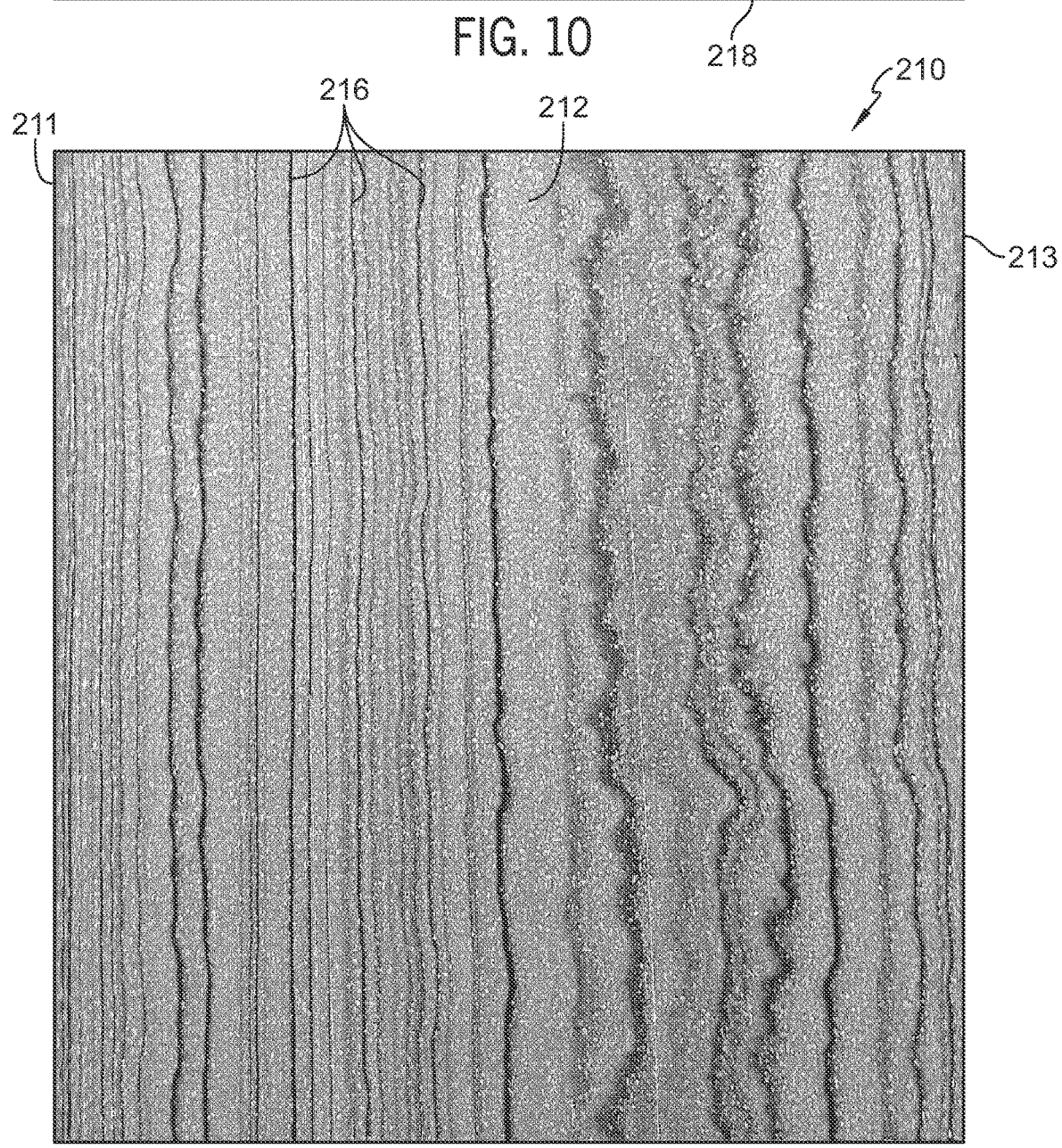
FIG. 11 is a top plan view of the polymer substrate of FIG. 10 showing a wood grain pattern of the polymer substrate after a portion of the outer surface is removed.

Each polymer substrate 10, 210 includes a multi-tone, simulated natural wood-grain effect that runs throughout the entire substrate (cross section) as shown in FIGS. 6 and 10. The simulated wood grains 16, 216 also extend to an outer surface, for example top surface 12, 212, of each substrate 10, 210 so that when removal of material occurs, such as through planing or cutting, the multi-tone wood grain effect remains both on the surface 12, 212 as well as with an exposed core 14, 214 of the substrates as suggested in FIGS. 9 and 11. Alternatively, or in addition to planing, outer surface 12, 212 of substrates 10, 210 can be embossed, such as with a wood grain pattern, as suggested in FIG. 8.

In one embodiment, polymer substrate 10 of the present disclosure includes continuous linear lines of color wood grain patterns 16 particularly within the core 14 and exposed core surfaces 12 to emulate wood rings or graining, as shown in FIGS. 6-9. In the illustrative embodiment, polymer substrate 10 is made using extrusion machine 100, shown in FIG. 1, from a first polymer 120 and a second polymer 124. A first extruder 118 is adapted to extrude first polymer 120, which is blended with a primary (main) base color. The first polymer 120 forms the lighter portions of polymer substrate 10. First polymer 120 includes a polymer material, such as a high density polyethylene resin. In some embodiments, the first polymer 120 is mixed with other additives, such as foaming agent, UV stabilizers, color concentrates, and other fillers such as fiberglass, minerals, etc.

A second extruder 122 of extrusion machine 100 is adapted to extrude second polymer 124 as shown in FIG. 1. Second polymer 124 includes a polymer material, such as a high density polyethylene resin. In some embodiments, the second polymer 124 is mixed with other additives, such as foaming agent, UV stabilizers, color concentrates, and other fillers such as fiberglass, minerals, etc.

Second polymer 124 is blended with an accent color used to form wood grain patterns 16 of substrate 10 as suggested in FIG. 6. The accent color for second polymer 124 and base color for first polymer 120 are different from one another. The accent color is chosen to complement the base color, and each will remain distinctive in the final extrusion. In some embodiments, the base and accent colors simulate the colors in natural wood, whether fresh cut, dried, aged, or otherwise. In some embodiments, the grains 16, 216 of substrates 10, 210 simulate natural wood grain, and the base and accent colors used are generally not characteristic of natural wood, such as purple, orange, black, and pink, just to name a few.

In some embodiments, first and second polymers 120, 124 partially intermix, along with the main and accent colors, to produce shade and combinations of color which are identified as polymer A/B blend(s) 123 as suggested in FIG. 1. For example, first polymer 120 could be white in color and second polymer 124 could be black in color. When blended according to the present disclosure, areas that intermix showing shades of gray are defined as polymer A/B blend 123. One or more additional accent color extruders can be used to add other accent colored resins into the flow stream through extrusion machine 100.

A flow adapter 125 is coupled to first extruder 118 by securing flow adapter 125 to an adapter plate 126 by use of fasteners, such as bolts, as suggested in FIG. 1. Flow adapter 125 is positioned to receive the output flows from extruders 118, 122 and configured to initiate the combined flow of first and second polymers 120, 124 through extrusion machine 100. The combined flow of first and second polymers 120, 124 is then directed to flow divider 140 for formation of the wood grain pattern.

Figure 2:
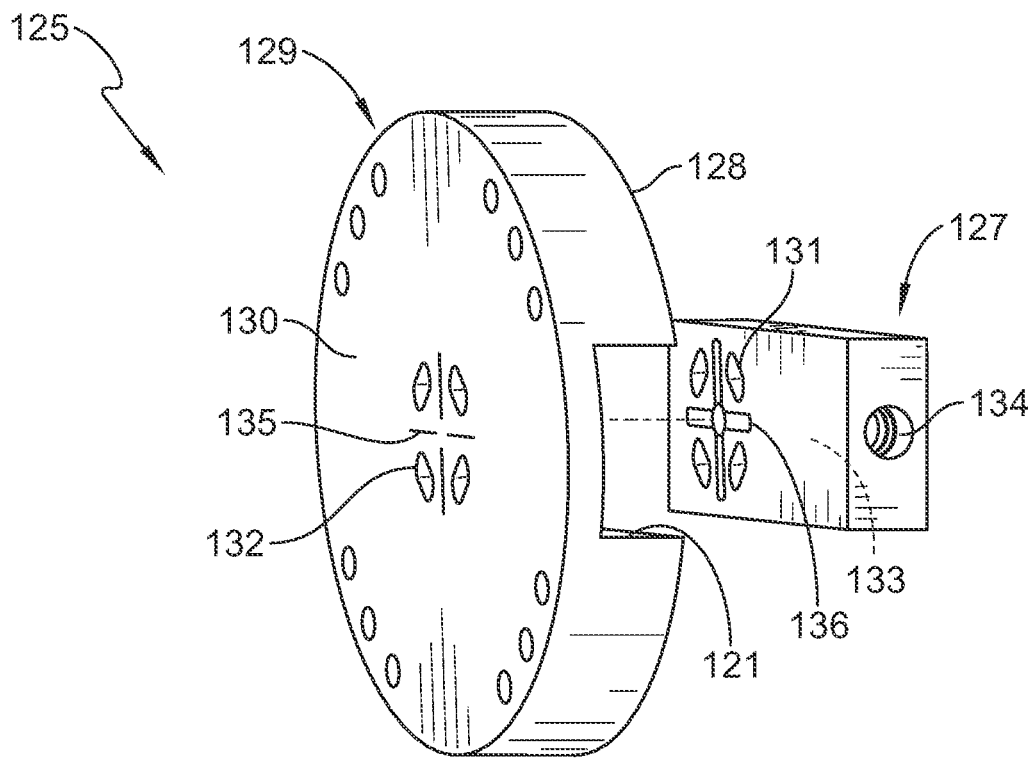
FIG. 2 is an exploded perspective view of a flow adapter of the extrusion machine of FIG. 1 showing that the flow adapter includes a body plate and an co-extrusion insert.
Figure 3:
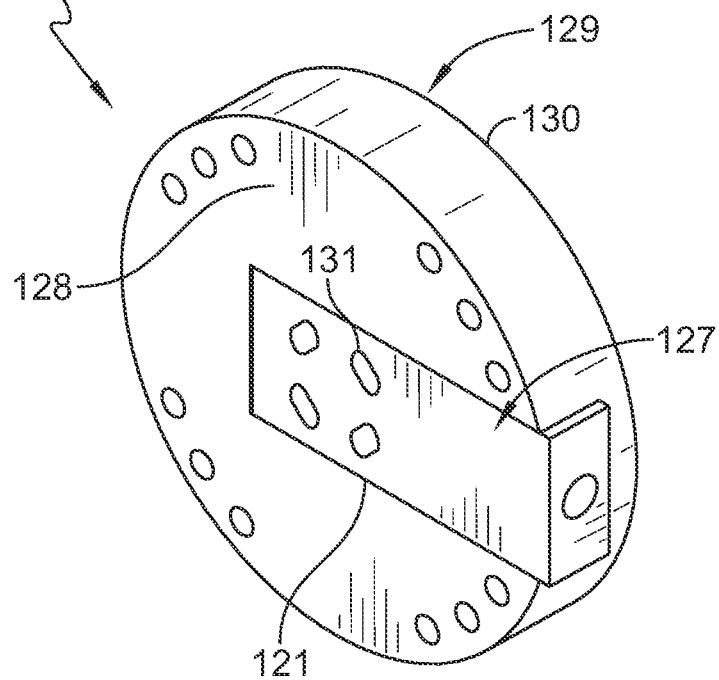
FIG. 3 is a perspective view of the flow adapter of FIG. 2.
Figure 4:
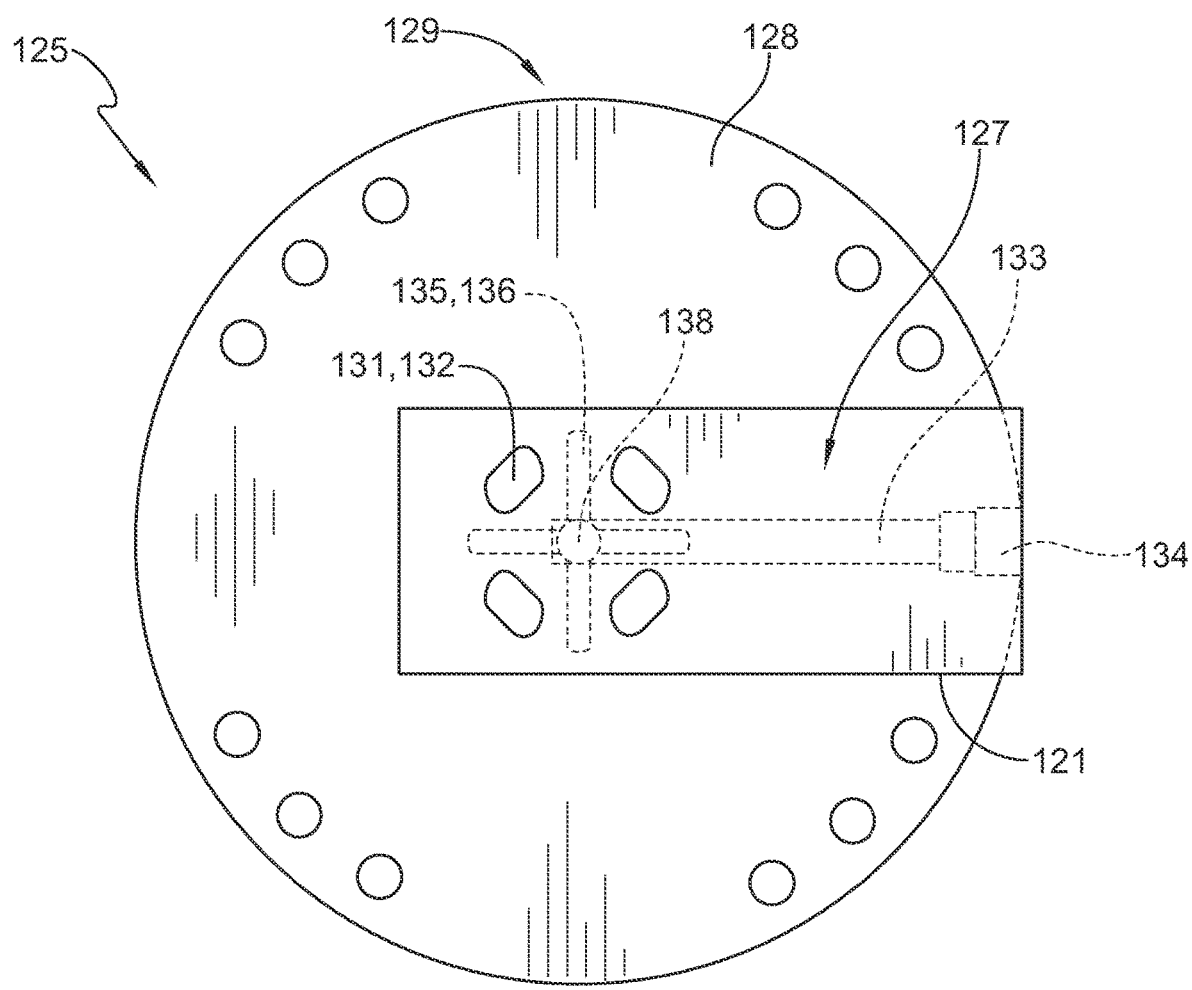
FIG. 4 is a front elevation view of the flow adapter of FIG. 2.

Flow adapter 125 includes a body plate 129 and a co-extrusion insert 127 as shown in FIGS. 2-4. Body plate 129 includes a first face 128 and a second face 130, and is formed to include a slot 121 in first face 128. A series of first apertures 132 are formed through second face 130 and into slot 121. A series of pass-through apertures 131 extend through co-extrusion insert 127 in a similar pattern to first apertures 132. Slot 121 is configured to receive co-extrusion insert 127 to align first apertures 132 of body plate 129 with pass-through apertures 131 of co-extrusion insert 127. Aligned first apertures 132 and pass-through apertures 131 allow first polymer 120 to flow through flow adapter 125 from first face 128 to second face 130 as suggested in FIGS. 1-4.

Co-extrusion insert 127 is also formed to include an internal passageway 133 that is coupled to second extruder 122 at a first end 134 and is in fluid communication with injection ports 136 at a second end 138 as shown in FIGS. 2 and 4. A series of second apertures 135 are formed through second face 130 of body plate 129 into slot 121 and are positioned between first apertures 132 such that first and second apertures 132, 135 alternate with one another around a centerline of the extrusion machine 100 as suggested in FIG. 2.

Injection ports 136 align with second apertures 135 when co-extrusion insert 127 is received in slot 121 as suggested in FIGS. 2-4. Body plate 129 and co-extrusion insert 127 cooperate so that first and second polymers 120, 124 are extruded together through flow adapter 125. In the illustrative embodiment, first apertures 132 are larger than second apertures 135. This arrangement allows second polymer 124, which is the accent color, to exit the flow adapter 125 simultaneously with first polymer 120 in a defined geometric relationship and proportional flow rate. Flow adapter 125 permits the ability to design a variety of patterns and flow rates of first and second polymers 120, 124 to associate with different profile sizes and well as different linear graining and streaking aesthetics by changing the number and size of the openings 132, 135.

The combined flow of first and second polymer 120, 124 exit from flow adapter 125 and enter a reducer 139 of extrusion machine 100 as shown in FIG. 1. Reducer 139 increases pressure of the flow by reducing a cross section of the combined extrusions. Reducer 139 directs the flow of the first and second polymers 120, 124 into flow divider 140.

Flow divider 140 includes a channel 149 formed through flow divider 140 and a plurality of section inserts 141-147 positioned within the channel 149 as shown in FIG. 1. Section inserts 141-147 are coupled to one another to form a continuous dividing element 148 as suggested in FIG. 5. In the illustrative embodiment, each section insert 141-147 is a plate having opposing ends twisted relative to one another to form a helical profile. Section inserts 141-147 are coupled to one another such that the helical profile along the combined dividing element is offset and reversed with each connected section insert 141-147.

Figure 5:
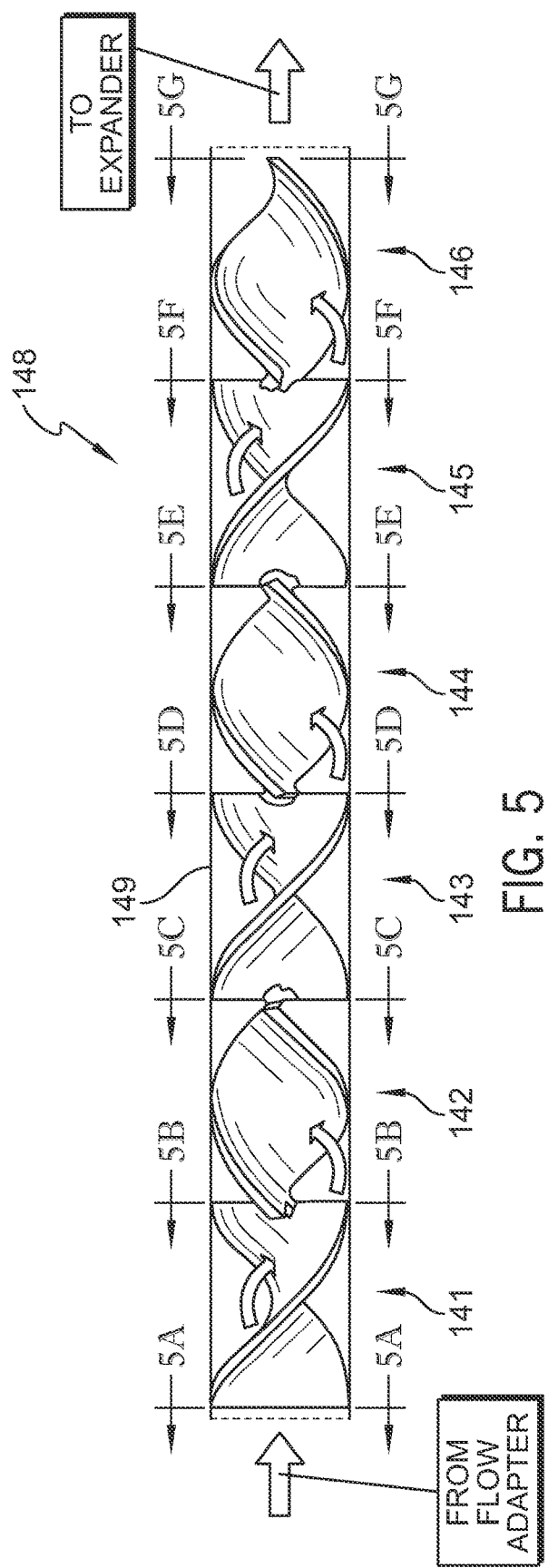
FIG. 5 is a side elevation view of a set of section inserts used in the extrusion machine to form layers of different color polymers as suggested in FIGS. 5A-5G.
Figures 5A, 5B, 5C, 5D, 5E, 5F, 5G:
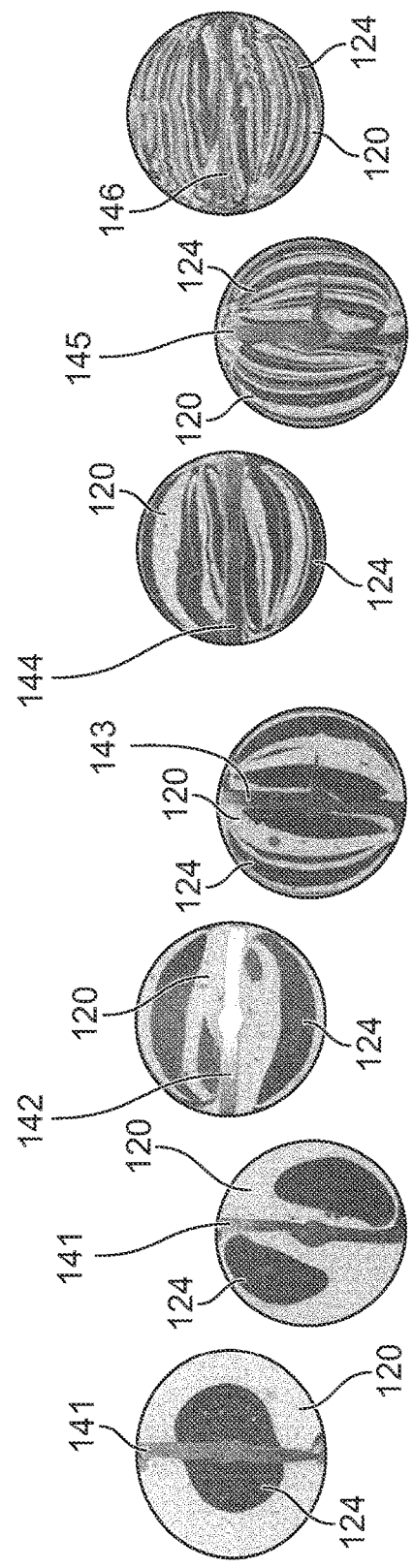
FIGS. 5A-5G are sectional views taken at the beginning and end of each section insert in FIG. 5.

Section inserts 141-147 cut across and redirect the combined flow of first and second polymer 120, 124 as the flow passes through channel 149 of flow divider 140 as suggested in FIGS. 1 and 5-5G. Section inserts 141-147 can be of different designs and fit together in a variety of orientations to vary the wood grain patterns 16 of polymer substrate 10. For illustrative purposes, six section inserts 141-146 are shown in FIG. 5. Seven section inserts 141-147, as shown in FIG. 1, can be included in the flow divider 140, but it is contemplated that any number of section inserts can be used to vary the grain pattern formed in the polymer substrate 10.

Generally, the number of section inserts can be used to control the number of layers in the substrate. More or less section inserts can also be used depending on the size of the substrate being produced.

In the illustrative embodiment, the design, orientation, and number of section inserts 141-147 determine the linear graining and layering aesthetics for a particular profile size and shape of polymer substrate 10. For example, as suggested in FIGS. 5 and 5G, a horizontal (longitudinal to the substrate) orientation of the final end of the dividing element 148 produces horizontal layers in the flow, which leads to horizontal grains in the final polymer substrate 10 as suggested in FIG. 6. Having the final end of the dividing element 148 oriented vertically produces vertical (transverse to the substrate) layers in the flow, which leads to vertical grains in the final polymer substrate 10 as suggested in FIG. 10.

With each successive section insert 141-147, the interlayering of first polymer 120 and second polymer 124 increases the amount of linear graining between the two polymers 120, 124 as well as promote the polymer A/B blending 123 which produces multiple color combinations and layers of the two colors as depicted in FIGS. 5A-5G. The portions of the flow contacting the channel 149 and inner dividing element 148 experience less movement than other portions of the flow due to the viscosity of the material. The continuous dividing and rotation of the flow causes layers of first and second polymer 120, 124 to form on one another within the flow rather than forming a homogeneous mixture.

The combined flow of layered polymers 120, 124 exiting section insert 147 enters an expander 152 as shown in FIG. 1. Expander 152 reduces pressure of the flow by allowing the flow to expand. Expander 152 directs the flow into the entry of a die 154 for forming the general profile of polymer substrate 10. The substrate 10 enters tooling with similar dimensions to the die exit to begin cooling and forming the final product.

As shown in FIG. 6, polymer substrate 10 can be cut through the core 14 to expose the wood grain pattern 16 created by extrusion machine 100. The wood grain 16 in the core 14 of polymer substrate 10 is oriented generally horizontal and the individual grains are closely spaced to one another. The grains 16 (formed from second polymer 124) are generally thinner than the remaining layers (formed from first polymer 120) of the substrate 10. Outer surfaces 12 of polymer substrate 10 have a matte finish and limited wood grain visibility after exiting the die 154 as suggested in FIG. 7. In some embodiments, surfaces 12 of polymer substrate 10 can be further enhanced by embossing techniques applied to the surfaces 12 as suggested in FIG. 8. Embossing can provide a texture similar to natural wood lumber and add to the wood grain effect in the final product. Alternatively or in addition to embossing, a thin layer can be removed from each outer surface 12, such as by planing, to expose the wood grain pattern 16 as suggested in FIG. 9. In the illustrative embodiment, a burling effect is created due to the horizontally oriented and closely spaced grains 16.

As noted above, variations in wood grain patterns can be created depending upon the arrangement of the flow divider. A polymer substrate 210 produced by extrusion machine 100 includes vertical graining 216 in a core 214 of polymer substrate 210 as shown in FIG. 10. The wood grain 16 in the core 14 of polymer substrate 10 is oriented generally vertical and the individual grains are widely spaced from one another. The grains 216 (formed from second polymer 124) are generally thinner than the remaining layers (formed from first polymer 120) of the substrate 10. Similar post processing steps to polymer substrate 10 can be performed on polymer substrate 210. For example, planing of outer surfaces 212 of polymer substrate 210 can expose the wood grain 216 as suggested in FIG. 11. In the illustrative embodiment, the exposed grains generally align with one another along a length of the substrate 210 due to the vertically oriented and widely spaced grains 216. In some embodiments, the grains 216 mimic the organic rings of a tree.

The illustrative process can be used to form polymer substrates form 10, 210 continuously as an extrudate. As noted above, polymer substrates 10, 210 can be cut to form polymer boards used in the construction of various end products. In the illustrative embodiment, boards are created by making subsequent cuts across the extrudate to define a length of the board, with the orientation of the ends of the board defining a length direction. Various cross-sectional profiles are possible, such as round, polygonal, or other unique shapes, such as those used for molding used around windows and doors for example. These profiles can be created using the die 154, or through post processing of the boards.

The wood-grain patterns 16, 216 in the resulting boards formed from polymer substrates 10, 210 generally extend along the length of the board. In some embodiments, a majority of the wood grains 16, created by the layers of the second polymer 124, extend along the length of the entire board. Likewise, the remaining portions of the board, created by the interspersed layers of the first polymer 120, also generally extend along the length of the board. In some embodiments, a majority of the layers of the first polymer 120 extend along the length of the entire board. This creates a substantially consistent pattern along the length of the board such that cuts various points along a length of the board will expose a substantially similar grain pattern.

As noted above, the wood grains 16, 216 can be oriented along different directions. In some embodiments, a width direction of the substrate 10 is oriented such that wood grains 16 extend between lateral sides 11, 13 of substrate 10 as suggested in FIG. 6. The layers of first and second polymers 120, 124 are stacked from a bottom surface 18 of substrate 10 toward the top surface 12. In some embodiments, a width direction of the substrate 10 is oriented such that wood grains 216 extend between top surface 212 and a bottom surface 218 of substrate 210 as suggested in FIG. 10. The layers of first and second polymers 120, 124 are stacked from a lateral surface 211 toward a lateral surface 213 of substrate 210. Generally, the width direction is perpendicular to the length direction and rotationally oriented around the length direction.

The width direction (i.e., cross-direction of the grains 16, 216) can assume various orientations to change the orientation of the grains 16, 216 to simulate natural wood grains of different patterns. For example, the exposed grain patterns in natural wood assume different orientations depending on the portion of the timber the board is cut from. The orientation of the grains 16, 216 can be changed to simulate these different patterns. In the illustrative embodiments, the grains 16, 216 extend along curvilinear paths across the width of the substrates 10, 210. In some embodiments, a majority of the grains 16, 216 extend substantially uninterrupted across the board, i.e., with minimal or no gaps in the visible grain 16, 216.

In illustrative embodiments, the other portions of the substrates 10, 210 formed by the first polymer 120 are similar to the grains 16, 216. The layers formed by the first polymer 120 extend along a length of the boards made from the substrates 10, 210 and across a width of the boards. In some embodiments, the grains 16, 216 are thinner than the layers formed by the first polymer 120.

Example of illustrative end products formed using the wood-grained polymer boards of the present disclosure are shown in FIGS. 12 and 13. A chair armrest 390 formed using polymer substrate 10, which was embossed on the outer surfaces 12, is shown in FIG. 12. The exposed wood grain 16 is clearly visible after cutting out the shape of the armrest 390 while the embossing provides the feel of natural wood. Another example of a chair armrest 490 formed using polymer substrate 210, which was embossed on the outer surfaces 212, is shown in FIG. 13. The exposed wood grain 216 is clearly visible after cutting out the shape of the armrest 490 while the embossing provides the feel of natural wood. Other structural and non-structural uses, such as decking and siding for example, are contemplated by this disclosure.

In illustrative embodiments, a wood-grained polymer substrate is provided having alternating layers of differently colored polymer material to produce a simulated natural wood grain appearance. The wood grain appearance runs through a core of the substrate such that the simulated wood grains are exposed when the substrate is cut. The wood-grained polymer substrate can be cut to length to form a wood-grained polymer board. The wood-grain polymer board is useful in the production of various end products, such as furniture and decking for example. The grain patterns are adjustable to simulate various cuts of natural wood timber. The grain patterns are substantially consistent along a length of the board such that cuts across the board at various points along the length will expose similar patterns.

Figure 14:
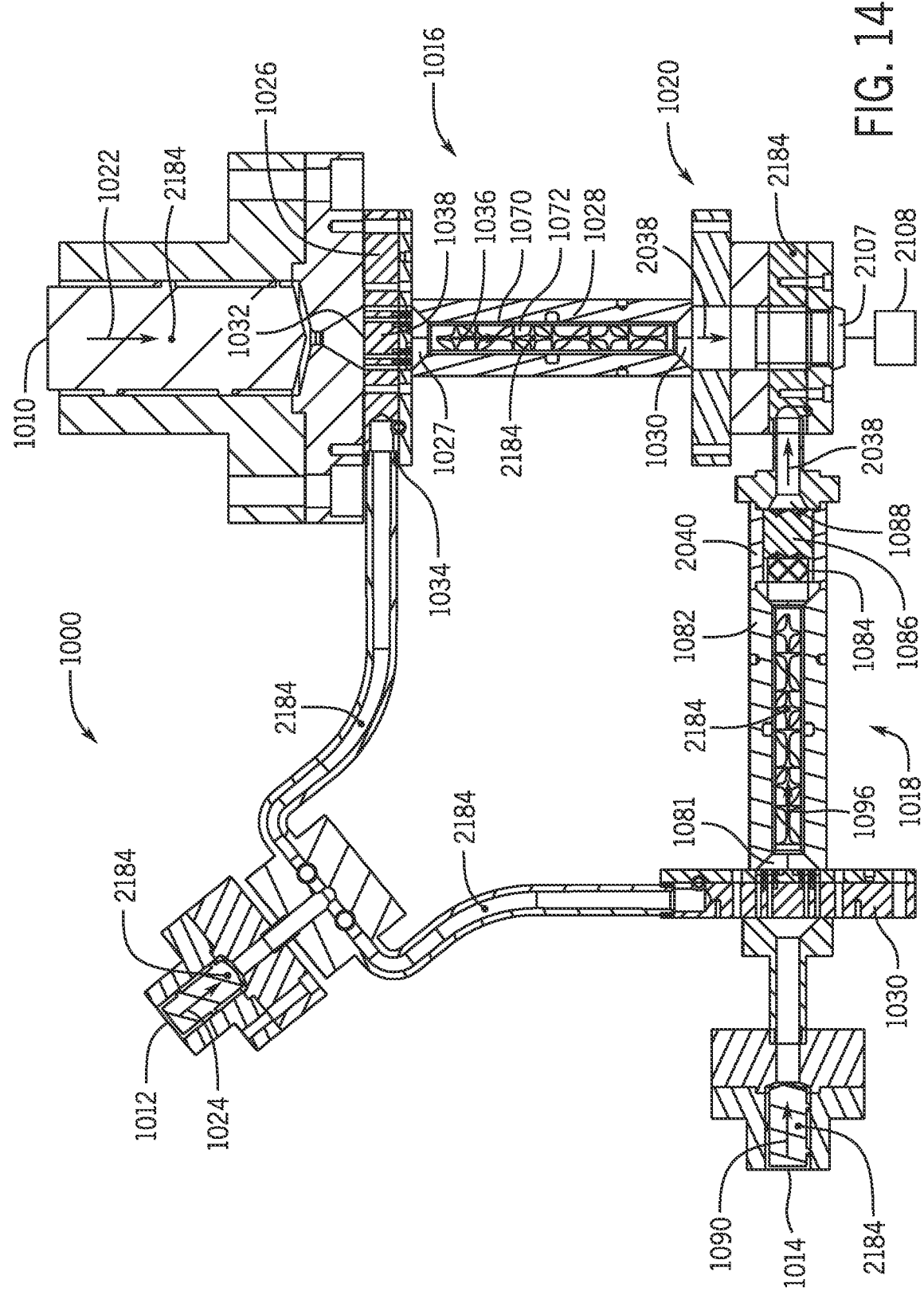
FIG. 14 is a sectional view through an alternative embodiment of an extrusion machine used to manufacture capped polymer substrates that simulate natural wood, according to certain aspects of the present disclosure.
Figure 28A:
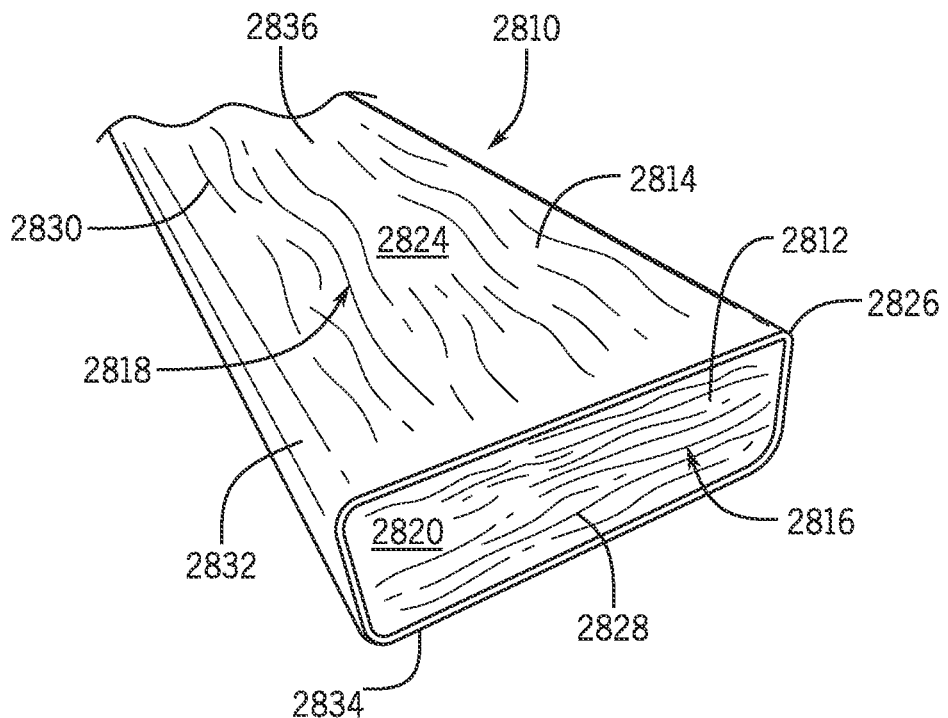
FIGS. 28A-28B are example illustrations of various samples of the capped polymer substrates that simulate natural wood associated with the example process of FIG. 27, according to certain aspects of the present disclosure.

With reference to FIG. 14, an alternative embodiment extrusion machine 1000 is exemplarily illustrated in accordance with certain aspects of the present disclosure. The extrusion machine 1000 is used to form a capped polymer substrate 2810, as illustrated in FIG. 28A. In certain aspects, the capped polymer substrate 2810 simulates natural wood. As will be discussed in more detail below, the capped polymer substrate 2810 includes a core 2812 and a cap 2814 fused substantially around the core 2812. The core 2812 of the capped polymer substrate 2810 includes varying wood-grained core patterns 2816 of simulated wood grain, which extend through and along the core 2812 of the capped polymer substrate 2810. The core 2812 of the capped polymer substrate 2810 can be made from polymer based materials, such as, but not limited to, recycled high density polyethylene (HDPE) that include at least two different colorants added thereto to define the wood-grained core patterns 2816. In some aspects, the core 2812 of the capped polymer substrate 2810 can include additives, such as, but not limited to, ultraviolet (UV) inhibitors, foaming agents, color concentrates, and other well-known additives in the industry, to produce substrates having desired colors and material properties such as durability and strength.

The cap 2814 of the capped polymer substrate 2810 includes varying wood-grained cap patterns 2818 of simulated wood grain, as illustrated in FIG. 28A. As discussed previously, the cap 2814 is fused substantially around the core 2812. For example, the cap 2814 can be fused around the core 2812 in a compacted laminate manner. In certain aspects, the cap 2814 is condensed so that it does not contain any bubbles, such as gas bubbles, therethrough. In certain aspects, the cap 2814 is formed of copolymer material to provide a structural benefit to the capped polymer substrate 2810. In addition to the structural benefit, the cap 2814 is also designed so that it does not crack. In certain aspects, the cap 2814 is formed of virgin copolymer material.

The capped polymer substrate 2810 can be post-processed by various techniques, such as, but not limited to, planing, embossing, cutting, and other well-known techniques in the industry, to form various sized boards used to make polymer-lumber end products. For example, the boards can be shipped to customers who design and build a multitude of end products, such as furniture and the like. The customers can fabricate the end products using the capped polymer substrate 2810 (i.e., the board) just as they would using natural wood lumber. Fabrication using the capped polymer substrate 2810 could include, but is not limited to, drilling, routing, and cutting to build multi-component end products such as outdoor furniture including, but not limited to, Adirondack chairs, park benches, and the like, for example.

The core 2812 of the capped polymer substrate 2810 includes a multi-tone, simulated natural wood-grained effect that runs throughout the core 2812, as shown FIG. 28A. The core 2812 includes outer core surfaces 2820, which are exposed from the cap 2814 (i.e., the cap 2814 does not cover the outer core surfaces 2820 of the core 2812). As such, the wood-grained core patterns 2816 that extend through the core 2812 are visible at the outer core surfaces 2820. For example, when the capped polymer substrate 2810 is cut along a line parallel to the outer core surfaces 2820, the wood-grained core patterns 2816 are exposed and visible at that cut. The core 2812 also includes cohere surfaces 2822 to which the cap 2814 is fused. As such, the cohere surfaces 2822 of the core 2812 are not exposed, but are instead covered by the cap 2814. In such a manner, as described above, the capped polymer substrate 2810 includes the wood-grained cap patterns 2818 that are exteriorly visible, as well as, the wood-grained core patterns 2816 that are exteriorly visible at the outer core surfaces 2820, to emulate wood rings or graining, as illustrated in FIG. 28A.

Referring back to FIG. 14, the capped polymer substrate 2810 is fabricated using the extrusion machine 1000, as will be described in more detail below. The extrusion machine 1000 includes a first extruder 1010, a second extruder 1012, a third extruder 1014, a core assembly 1016, a cap assembly 1018, and a die 1020. In particular, the core 2812 is fabricated using the first extruder 1010, the second extruder 1012, and the core assembly 1016. The core 2812 is formed of a first polymer 1022 and a second polymer 1024. The first extruder 1010 extrudes the first polymer 1022, which can be blended with a primary or main base color for the wood-grained core patterns 2816. In certain aspects, a weight scale (not shown) and a blender (not shown) can be mounted to a feed throat of the first extruder 1010 to feed the primary or main base color (i.e., pellets) into the first extruder 1010. In certain aspects, the first polymer 1022 includes a polymer material such as, for example, a high density polyethylene resin. In certain aspects, the first polymer 1022 can be any one of, but not limited to, a homopolymer, a copolymer, a virgin homopolymer, a virgin copolymer, a recycled homopolymer, and a recycled copolymer. In certain aspects, the first polymer 1022 is mixed with other additives such as, but not limited to, foaming agents, ultraviolet (UV) stabilizers, color concentrates, fiberglass, minerals, and other fillers that are well-known in the industry.

The second extruder 1012 extrudes the second polymer 1024, which can be blended with a secondary or accent color to provide accent coloring with respect to the first polymer 1022 for the wood-grained core patterns 2816. For example, the accent color of the second polymer 1024 can be selected to complement the main color of the first polymer 1022 so that each color will remain distinctive in the core 2812. In certain aspects, a weight scale (not shown) and a blender (not shown) can be mounted to a feed throat of the second extruder 1012 to feed the secondary or accent color (i.e., pellets) into the second extruder 1012. In certain aspects, the accent color of the second polymer 1024 is different from the main color of the first polymer 1022. In certain aspects, the second polymer 1024 includes a polymer material such as, for example, a high density polyethylene resin. In certain aspects, the second polymer 1024 can be any one of, but not limited to, a homopolymer, a copolymer, a virgin homopolymer, a virgin copolymer, a recycled homopolymer, and a recycled copolymer. In certain aspects, the second polymer 1024 is a material that is the same as the first polymer 1022. In certain other aspects, the second polymer 1024 is a different material than the first polymer 1022. In certain aspects, the main color of the first polymer 1022 and the accent color of the second polymer 1024 simulate the colors and patterns in natural wood, whether fresh cut, dried, aged, or otherwise. In other aspects, while the wood-grained core patterns 2816 emulate natural wood grain, the main color of the first polymer 1022 and the accent color of the second polymer 1024 can be selected from colors that are non-characteristic of natural wood such as, for example, purple, orange, black, and pink, to name a few.

In certain aspects, the first polymer 1022 and the second polymer 1024 partially intermix, along with the main and accent colors, to produce shade and combinations of color. For example, the first polymer 1022 could be white in color and the second polymer 124 could be black in color. When blended according to the present disclosure, areas that intermix could show shades of gray in a polymer blend of the first polymer 1022 and the second polymer 1024. In certain aspects, one or more additional accent color extruders can be used to add other accent colored resin into the flow stream through the core assembly 1016 of the extrusion machine 1000.

The first extruder 1010 and the second extruder 1012 are coupled to the core assembly 1016 to transfer the first polymer 1022 and the second polymer 1024, respectively, thereto. The core assembly 1016 includes a core flow adapter 1026, a core flow reducer 1027, a core flow divider 1028, and a core flow expander 1030. The core flow adapter 1026 is upstream of the core flow divider 1028, which is upstream of the core flow expander 1030. While the core flow adapter 1026 will be described in more detail below, it should be understood that, in certain aspects, the flow adapter 125 of FIG. 1 could be interchanged with the core flow adapter 1026.

Figure 15:
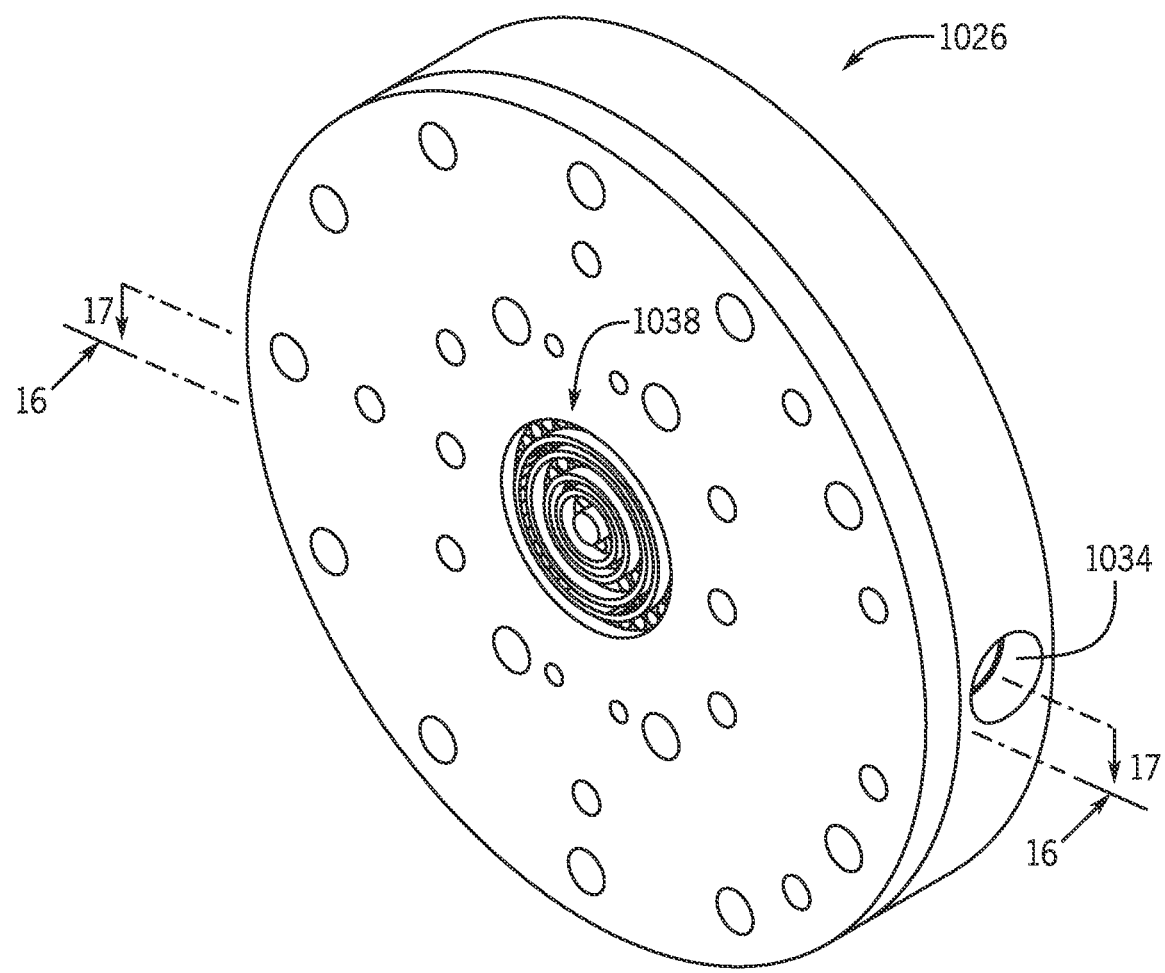
FIG. 15 is a perspective view of an alternative embodiment of a flow adapter of the extrusion machine of FIG. 14, according to certain aspects of the present disclosure.
Figure 16:
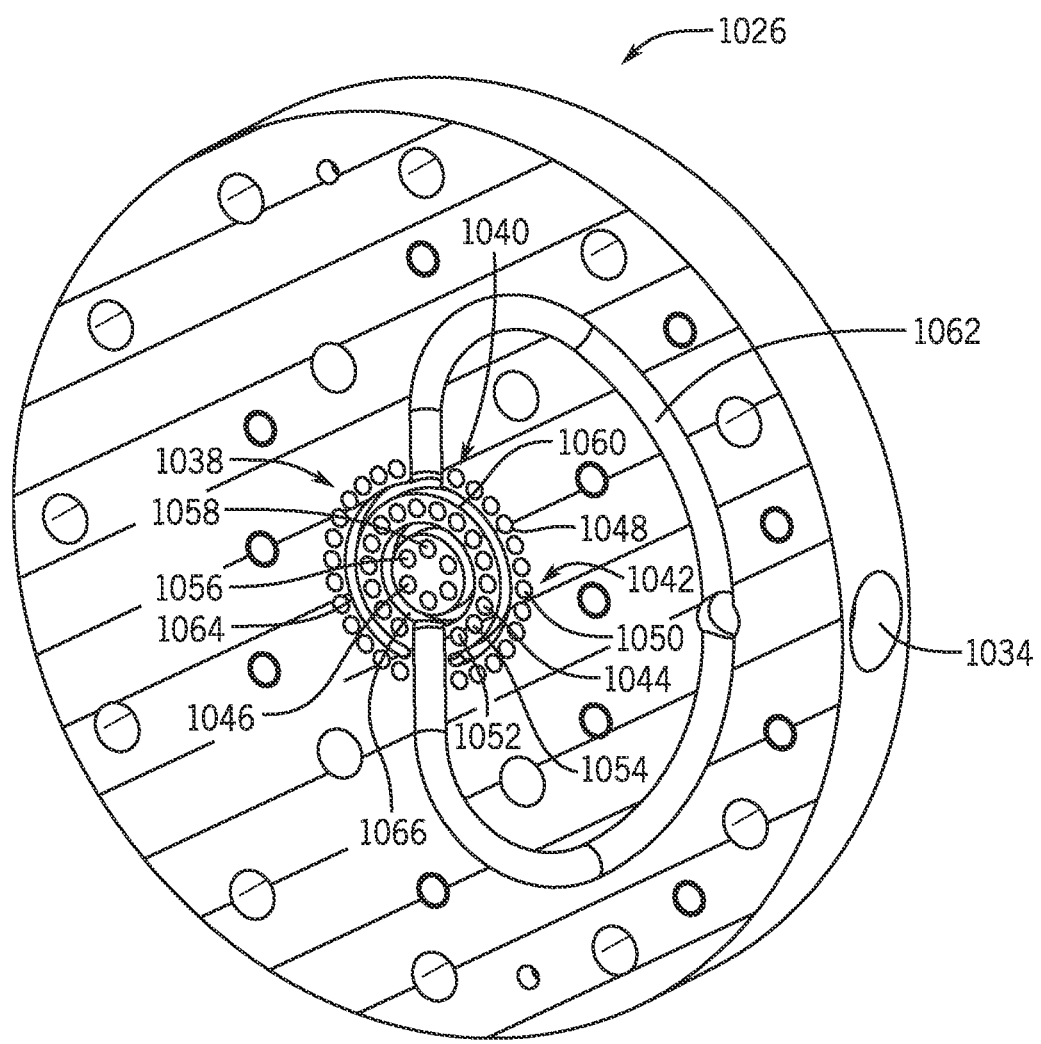
FIG. 16 is a cross-sectional view of the flow adapter of FIG. 15 taken along line 15A-15A, according to certain aspects of the present disclosure.
Figure 17:
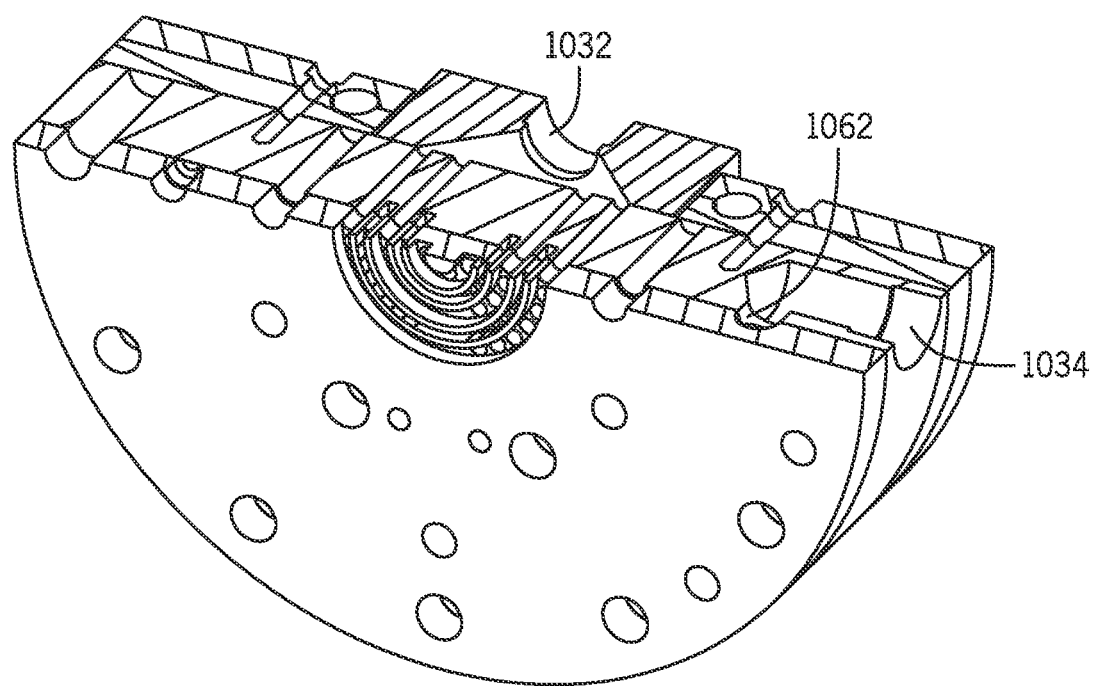
FIG. 17 is a cross-sectional view of the flow adapter of FIG. 15 taken long line 15B-15B, according to certain aspects of the present disclosure.

As illustrated in FIGS. 15-17, the core flow adapter 1026 includes a first port 1032 and a second port 1034. The first port 1032 is coupled to the first extruder 1010 for receiving the first polymer 1022 from the first extruder 1010. The second port 1034 is coupled to the second extruder 1012 for receiving the second polymer 1024 from the second extruder 1012. The core flow adapter 1026 is configured to co-extrude or combine the first polymer 1022 and the second polymer 1024 into a combined core flow 1036 (see FIG. 14) that is directed to the core flow divider 1028. The core flow adapter 1026 includes a core co-extruder 1038 in communication with the first port 1032 and the second port 1034. The core co-extruder 1038 is centrally disposed through the core flow adapter 1026. The core co-extruder 1038 includes a plurality of apertures 1040 in communication with the first port 1032 to extrude the first polymer 1022 through the core flow adapter 1026 to the core flow divider 1028. In certain aspects, the plurality of apertures 1040 includes a first series of apertures 1042, a second series of apertures 1044, and a third series of apertures 1044. In such aspects, first apertures 1048 of the first series of apertures 1042 are disposed around a first circumference 1050, second apertures 1052 of the second series of apertures 1044 are disposed around a second circumference 1054, and third apertures 1056 of the third series of apertures 1046 are disposed around a third circumference 1058. In certain aspects, the first circumference 1050 is disposed radially outwardly from the second circumference 1054, which is disposed radially outwardly from the third circumference 1058.

Moreover, the core co-extruder 1038 includes a plurality of slots 1060 in communication with the second port 1034, via a duct 1062, to extrude the second polymer 1024 through the core flow adapter 1026 to the core flow divider 1028. In certain aspects, each slot of the plurality of slots 1060 are arcuate although other shapes are within the scope of the present disclosure. In certain aspects, the plurality of slots 1060 includes a first slot 1064 and a second slot 1066. The duct 1062 directs the second polymer 1024 received at the second port 1034 and delivers the second polymer 1024 to the first slot 1064 and the second slot 1066. In certain aspects, the first slot 1064 is disposed radially inward of the first series of apertures 1042 such that it is arranged between the first series of apertures 1042 and the second series of apertures 1044, and the second slot 1066 is disposed radially inward of the second series of apertures 1044 such that it is arranged between the second series of apertures 1044 and the third series of apertures 1046. Such arrangement of the plurality of apertures 1040 with respect to the plurality of slots 1060 allows the second polymer 1024, which is the accent color, to exit the core flow adapter 1026 simultaneously with the first polymer 1022, which is the main color, in a defined geometric relationship and at a proportional flow rate. Although certain designs and arrangements of the plurality of apertures 1040 and the plurality of slots 1060 of the core flow adapter 1026 are described above, it should be understood that other designs and arrangements are within the scope of the present disclosure. The plurality of apertures 1040 and the plurality of slots 1060 can be arranged in various numbers and/or sizes to vary the geometric patterns and flow rates of the first polymer 1022 and the second polymer 1024 exiting the core flow adapter 1026 to produce different linear graining and streaking aesthetics of the combined core flow 1036 entering the core flow divider 1028. While the flow adapter 125 of the extrusion machine 100 includes the co-extrusion insert 127 having the apertures 131 and the injection ports 136 that require alignment with the first apertures 132 and the second apertures 136, respectively, the core flow adapter 1026 includes the plurality of apertures 1040, which may be created through the core flow adapter 1026, such as, for example, by drilling, and does not require alignment with other apertures on another component. In view of the geometry of the plurality of apertures 1040, the core flow adapter 1026 may provide a more consistent combined core flow 1036 than the geometry of the flow adapter 125.

The combined core flow 1036 exits the core flow adapter 1026 at the core co-extruder 1038 and enters the core flow reducer 1027, such as the reducer 139 of the extrusion machine 100 of FIG. 1, which is coupled to the core flow adapter 1026. The core flow reducer 1027 receives and increases pressure of the combined core flow 1036 by reducing a cross section thereof. The core flow reducer 1027 is coupled to the core flow divider 1028 and directs the combined core flow 1036 thereto. In certain aspects, the combined core flow 1036 exits the core flow adapter 1026 at the core co-extruder 1038 and directly enters the core flow divider 1028.

Figure 20:
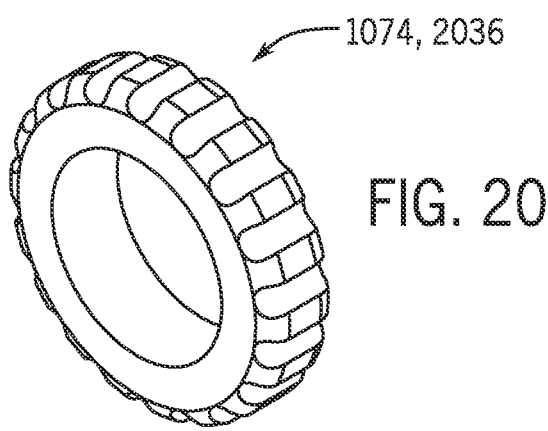
FIG. 20 is a perspective view of a gear utilized with the flow divider of FIGS. 19A-B, according to certain aspects of the present disclosure.

Referring to FIG. 14, the core flow divider 1028 is similar to the flow divider 140 of the extrusion machine 100 of FIG. 1. The core flow divider 1028 includes a channel 1068, a tube 1070, a plurality of section inserts 1072, and a gear 1074. The channel 1068 is disposed through the core flow divider 1028 and couples the core flow reducer 1027 to the core flow expander 1030. The tube 1070 is received by the channel 1068 and is selectively movable within the channel 1068 via the gear 1074 (see FIG. 20), which is mechanically engaged with the tube 1070. The plurality of section inserts 1072 is coupled to the tube 1070. The gear 1074 is partially exposed through the core flow divider 1028 to facilitate in selectively moving the position of the tube 1070 within the channel 1068 to orientate the plurality of section inserts 1072 to effect the wood-grained core patterns 2816 of the core 2812.

As the plurality of section inserts 1072 is similar to the plurality of section inserts 141-147 described above in reference to the extrusion machine 100 of FIG. 1, a brief description is provided below. The section inserts of the plurality of section inserts 1072 are consecutively coupled such that adjacent section inserts are coupled to each other to form a continuous dividing element. Each section insert of the plurality of section inserts 1072 is a plate having opposing ends twisted relative to one another to form a helical profile. The section inserts of the plurality of section inserts 1072 are coupled in such a manner that the helical profile along the continuous dividing element is offset and reversed with each connected section insert.

The plurality of section inserts 1072 receive the combined core flow 1036 from the core flow reducer 1027 and redirect the combined core flow 1036 through the core flow divider 1028 to produce a layered core flow 1076 upon exit of the core flow divider 1026. The plurality of section inserts 1072 can be of different designs and fit together in a variety of orientations to vary the wood-grained core patterns 2816 of the core 2812. Any number of section inserts can be used to vary the wood-grained core patterns 2816. Generally, the number of section inserts can be used to selectively control the number of layers in the core 2812. More or less section inserts can be used depending on the desired size of the capped polymer substrate 2810.

As noted above, the design, orientation, and number of section inserts of the plurality of section inserts 1072 determine the linear graining and layering aesthetics of the wood-grained core patterns 2816 for a particular profile size and shape of the core 2812 of the capped polymer substrate 2810. For example, orientating the final section insert of the plurality of section inserts 1072 (i.e., the section insert adjacent to the core flow expander 1030) in a horizontal orientation produces horizontal layers in the layered core flow 1076 exiting the core flow divider 1026. Orientating the final section insert of the plurality of section inserts 1072 in a vertical orientation produces vertical layers in the layered core flow 1076 exiting the core flow divider 1026. By controlling the gear 1074 to selectively position the plurality of section inserts 1072, the final section insert of the plurality of section inserts 1072 can be adjusted to a desired orientated in the horizontal orientation, the vertical orientation, and therebetween.

By increasing the number of section inserts of the plurality of section inserts 1072, the interlayering of the first polymer 1022 and the second polymer 1024 increases. This, in turn, increases the amount of linear graining, in the core 2812, between the first and second polymers 1022, 1024 as well as promote the blending, which produces multiple color combinations and layers of the main and accent colors. As the combined core flow 1036 flows through the core flow divider 1028, the portions of the combined core flow 1036 that contacts the tube 1070 and the plurality of section inserts 1072 experience less movement than other portions of the combined core flow 1036 due to the viscosity of the material. The continuous dividing and rotation of the combined core flow 1036 causes layers of the first and the second polymers 1022, 1024 to form on one another within the combined core flow 1036 rather than forming a homogeneous mixture.

The layered core flow 1076 exits the core flow divider 1028 and enters the core flow expander 1030, which is coupled to the core flow divider 1028. The core flow expander 1030 reduces pressure on the layered core flow 1076 by allowing the layered core flow 1076 to expand. The core flow expander 1030 is coupled to a first inlet 1078 (see FIG. 23) of the die 1020 and directs the layered core flow 1076 to the first inlet 1078 of the die 1020 for forming the core 2812 and fusing the cap 2814 to the core 2812.

Figure 18:
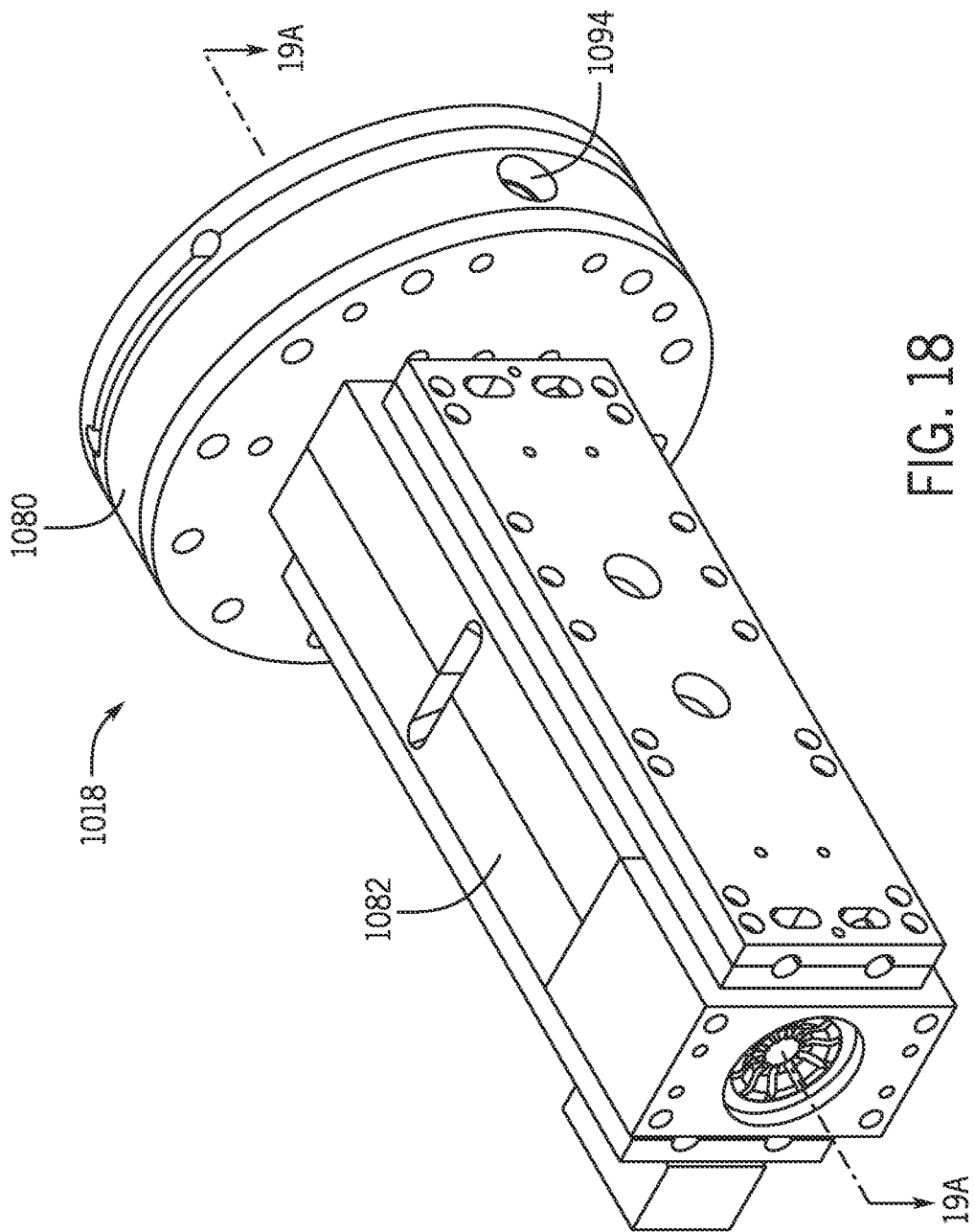
FIG. 18 is a perspective view of a cap assembly of the extrusion machine of FIG. 14, according to certain aspects of the present disclosure.

As discussed above, the extrusion machine 1000 includes a cap assembly 1018, which includes a cap flow adapter 1080, a cap flow divider 1082, a cap mixer 1084, a cap flipper 1086, and a cap flow reducer 1088. With reference to FIGS. 14 and 18-19, the cap assembly 1018 is coupled to the second extruder 1012 and a third extruder 1014. More particularly, the second extruder 1012 is coupled to, and in communication with, the cap flow adapter 1080 for transferring the second polymer 1024 to the cap assembly 1018 while the third extruder 1080 is also coupled to, and in communication with, the cap flow adapter 1080 for transferring a third polymer 1090 (see FIG. 14) to the cap assembly 1018. The cap 2814 is formed of the second polymer 1024, which acts as the accent color, and the third polymer 1090, which acts as the main color. In certain aspects, the third polymer 1090 includes a polymer material that is different from the second polymer 1024 such that the cap 2814 is formed of a co-polymer.

The structure of the cap flow adapter 1080 is generally similar to the structure of the core flow adapter 1026. As such, a first port 1092 of the cap flow adapter 1080 is coupled to the third extruder 1014 for receiving the third polymer 1090 from the third extruder 1014. A second port 1094 of the cap flow adapter 1080 is coupled to the second extruder 1012 for receiving the second polymer 1024 from the second extruder 1012. The cap flow adapter 1080 is configured to co-extrude or combine the second polymer 1024 and the third polymer 1090 into a combined cap flow 1096 that is directed to the cap flow divider 1082. The cap flow adapter 1080 includes a co-extruder 1098 in communication with the first port 1092 and the second port 1094. The cap co-extruder 1098 is centrally disposed through the cap flow adapter 1080. In certain aspects, an expander 2000 is disposed between the first port 1092 and the cap co-extruder 1098 to facilitate in the transfer of the third polymer 1090 from the first port 1092 to the cap co-extruder 1098.

The cap co-extruder 1098 includes a plurality of apertures 2002 in communication with the first port 1092 to extrude the third polymer 1090 through the cap flow adapter 1080 to the cap flow divider 1082. In certain aspects, the plurality of apertures 2002 includes a first series of apertures 2004, a second series of apertures 2006, and a third series of apertures 2008. In such aspects, first apertures 2010 of the first series of apertures 2004 are disposed around a first circumference 2012, second apertures 2014 of the second series of apertures 2006 are disposed around a second circumference 2016, and third apertures 2018 of the third series of apertures 2008 are disposed around a third circumference 2020. In certain aspects, the first circumference 2012 is disposed radially outwardly from the second circumference 2016, which is disposed radially outwardly from the third circumference 2020.

The cap co-extruder 1098 includes a plurality of slots 2022 in communication with the second port 1094, via a duct 2024, to extrude the second polymer 1024 through the cap flow adapter 1080. In certain aspects, each slot of the plurality of slots 2022 are arcuate although other shapes are within the scope of the present disclosure. In certain aspects, the plurality of slots 2022 includes a first slot 2026 and a second slot 2028. The duct 2024 directs the second polymer 1024 received at the second port 1094 and delivers the second polymer 1024 to the first slot 2024 and the second slot 2026. In certain aspects, the first slot 2026 is disposed radially inward of the first series of apertures 2004 such that it is arranged between the first series of apertures 2004 and the second series of apertures 2006, and the second slot 2028 is disposed radially inward of the second series of apertures 2006 such that it is arranged between the second series of apertures 2006 and the third series of apertures 2008. Such arrangement of the plurality of apertures 2002 with respect to the plurality of slots 2022 allows the second polymer 1024, which is the accent color, to exit the cap flow adapter 1080 simultaneously with the third polymer 1090, which is the main color, in a defined geometric relationship and at a proportional flow rate. Although certain designs and arrangements of the plurality of apertures 2002 are describe above, it should be understood that other designs and arrangements are within the scope of the present disclosure. The plurality of apertures 2002 and the plurality of slots 2022 can be arranged in various numbers and/or sizes to vary the geometric patterns and flow rates of the second polymer 1024 and the third polymer 1090 exiting the cap flow adapter 1080 to produce different linear graining and streaking aesthetics of the combined cap flow 1096 entering the cap flow divider 1082.

The combined cap flow 1096 exits the cap flow adapter 1080 at the cap co-extruder 1098 and enters the cap flow divider 1082. The cap flow divider 1082 is similar to the core flow divider 1028 of the core assembly 1016 described above with reference to FIG. 14. The cap flow divider 1082 includes a channel 2030, a tube 2032, a plurality of section inserts 2034, and a gear 2036. The channel 2030 is disposed through the cap flow divider 1082 and is arranged downstream of the cap co-extruder 1098 and upstream of the cap mixer 1084. In certain aspects, the combined cap flow 1096 exits the cap flow adapter 1080 at the cap co-extruder 1098 and enters a reducer 1081 before entering the cap flow divider 1082.

Figure 19A:
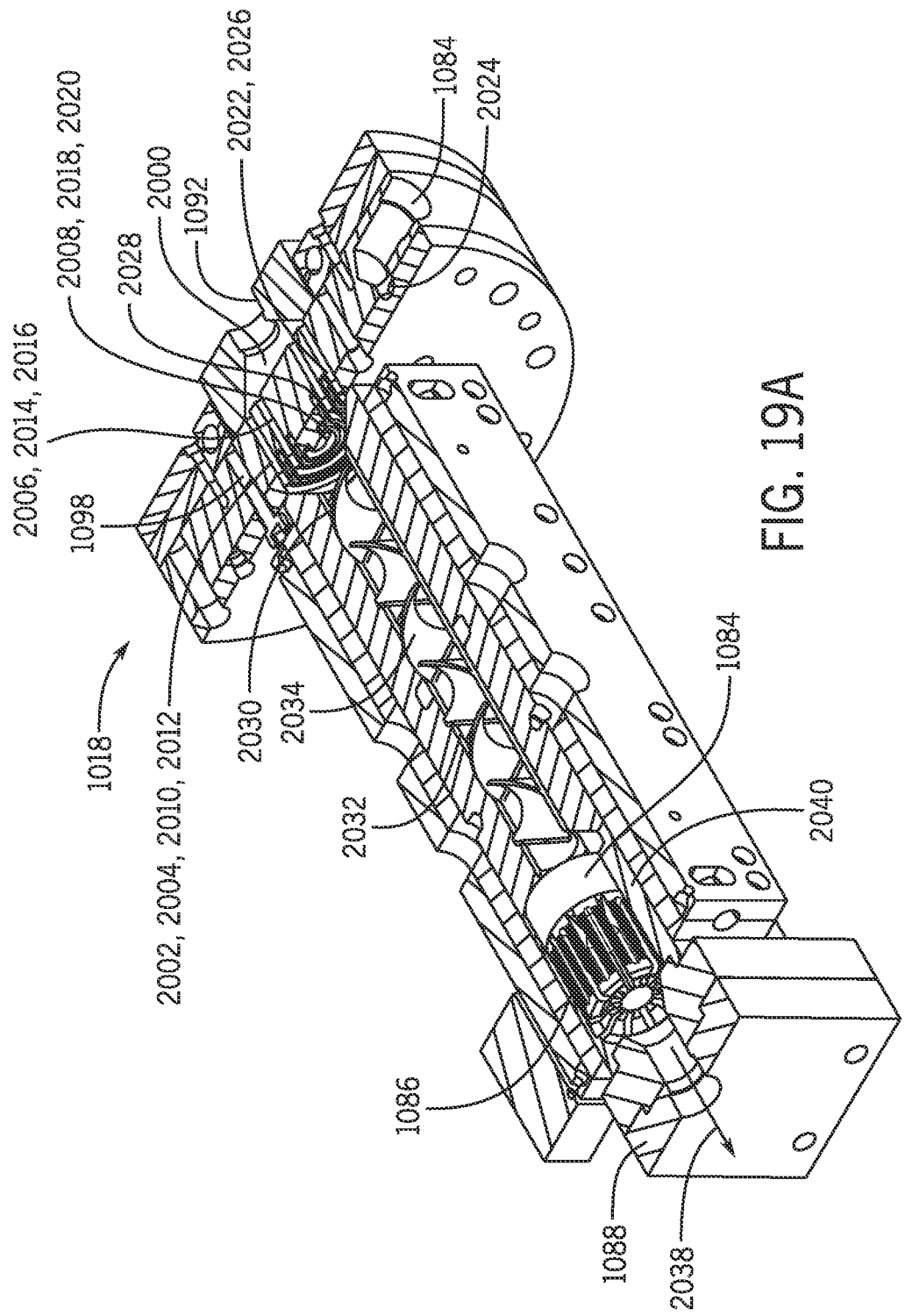
FIG. 19A is a cross-sectional view of the cap assembly of FIG. 18 taken along line 19-19 illustrating the flow adapter of FIG. 15, a flow divider, a mixer, and a flipper arranged downstream of the mixer, according to certain aspects of the present disclosure.
Figure 19B:
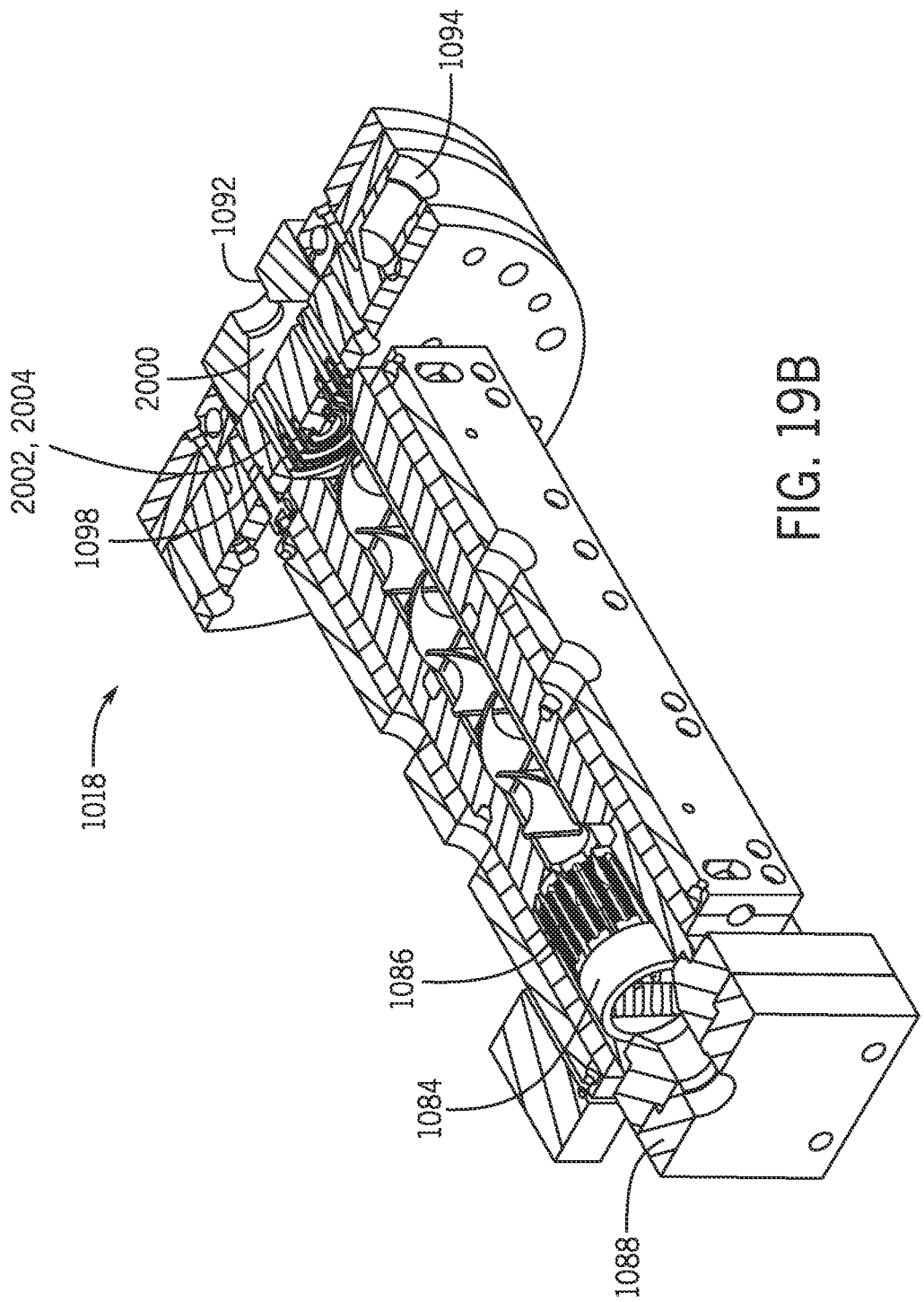
FIG. 19B is a cross-sectional view of an alternative cap assembly of FIG. 18 taken along line 19-19 illustrating the flow adapter of FIG. 15, a flow divider, a mixer, and a flipper arranged upstream of the mixer, according to certain aspects of the present disclosure.

Referring to FIG. 19A, the tube 2032 is received by the channel 2030 and is selectively movable within the channel 2030 via the gear 2036 (see FIG. 20), which is mechanically engaged with the tube 2032. The plurality of section inserts 2034 are coupled to the tube 2032. The gear 2036 is partially exposed through the cap flow divider 1082 to facilitate in selectively moving the position of the tube 2032 within the channel 2030 to orientate the plurality of section inserts 2034 to effect the wood-grained cap patterns 2818 of the cap 2814.

As the plurality of section inserts 2034 is similar to the plurality of section inserts 1072 described above in reference to the core assembly 1016, a brief description is provided below. The section inserts of the plurality of section inserts 2034 are consecutively coupled such that adjacent section inserts are coupled to each other to form a continuous dividing element. Each section insert of the plurality of section inserts 2034 is a plate having opposing ends twisted relative to one another to form a helical profile. The section inserts of the plurality of section inserts 2034 are coupled in such a manner that the helical profile along the continuous dividing element is offset and reversed with each connected section insert.

The plurality of section inserts 2034 receive the combined cap flow 1096 from the cap co-extruder 1098 of the cap flow adapter 1080 and redirect the combined cap flow 1096 to produce a layered cap flow 2038 upon exit of the cap flow divider 1082. The plurality of section inserts 2034 can be of different designs and can fit together in a variety of orientations to vary the wood-grained cap patterns 2818. While six (6) section inserts of the plurality of section inserts 2034 are illustrated in FIG. 19A, any number of section inserts can be used to vary the wood-grained cap patterns 2818. Generally, the number of section inserts can be used to selectively control the number of layers in the cap 2814. More or less section inserts can be used depending on the desired size of the capped polymer substrate 2810.

As noted above, the design, orientation, and number of section inserts of the plurality of section inserts 2034 determine the linear graining and layering aesthetics of the wood-grained cap patterns 2818 for a particular profile size and shape of the cap 2814 of the capped polymer substrate 2810. For example, orientating the final section insert of the plurality of section inserts 2034 (i.e., the section insert adjacent to the cap mixer 1084) in a vertical orientation produces wood-grained cap patterns 2818 that extend longitudinally in the layered cap flow 2038 exiting the cap flow divider 1082. On the other hand, orientating the final section insert of the plurality of section inserts 2034 in a horizontal orientation produces wood-grained cap patterns 2818 that extend traverse to the longitudinal direction of in the layered cap flow 2038 exiting the cap flow divider 1082. By controlling the gear 2036 to selectively position the plurality of section inserts 2034, the final section insert of the plurality of section inserts 2034 can be adjusted to a desired orientation in the horizontal orientation, the vertical orientation, and therebetween. In certain aspects, the orientation of the final section insert of the plurality of section inserts 2034 of the cap assembly 1018 is different to the orientation the final section insert of the plurality of section inserts 1074 of the core assembly 1016. For example, the final section insert of the plurality of section inserts 2034 of the cap assembly 1018 can be in the vertical orientation while the final section insert of the plurality of section inserts 1074 of the core assembly 1016 can be in the horizontal orientation.

By increasing the number of section inserts of the plurality of section inserts 2034, the interlayering of the second polymer 1024 and the third polymer 1090 increases. This, in turn, increases the amount of linear graining, in the cap 2814, between the second and third polymers 1024, 1090 as well as promote the blending, which produces multiple color combinations and layers of the main and accent colors. As the combined cap flow 1096 flows through the cap flow divider 1082, the portions of the combined cap flow 1096 that contacts the tube 2032 and the plurality of section inserts 2034 experience less movement than other portions of the combined cap flow 1096 due to the viscosity of the material. The continuous dividing and rotation of the combined cap flow 1096 causes layers of the second and the third polymers 1024, 1090 to form on one another within the combined cap flow 1096 rather than forming a homogeneous mixture.

With further reference to FIG. 19A, the cap flow divider 1082 includes a housing 2040 located downstream of the plurality of section inserts 2034. The housing 2040 houses the cap mixer 1084 and the cap flipper 1086. The cap mixer 1084 is downstream of the cap flow divider 1082 and upstream of the cap flipper 1086. The cap mixer 1084 is in communication with the cap flow divider 1086 and the cap flipper 1086. The cap mixer 1084 is configured to receive the layered cap flow 2038 and blend the layered cap flow 2038 so that the wood-grained cap patterns 2818 are more consistent (i.e., spread out the layering within the layered cap flow 2038). Furthermore, the cap mixer 1084 is configured to spread out the layers within the layered cap flow 2038 and make the layers smoother. In effect, the cap mixer 1084 can blur layer lines within the layered cap flow 2038 to make the layer lines less distinct. The blending of the layers together within the layered cap flow 2038, via the cap mixer 1084, can also remove possible imperfections from the layered cap flow 2038.

Figure 21:
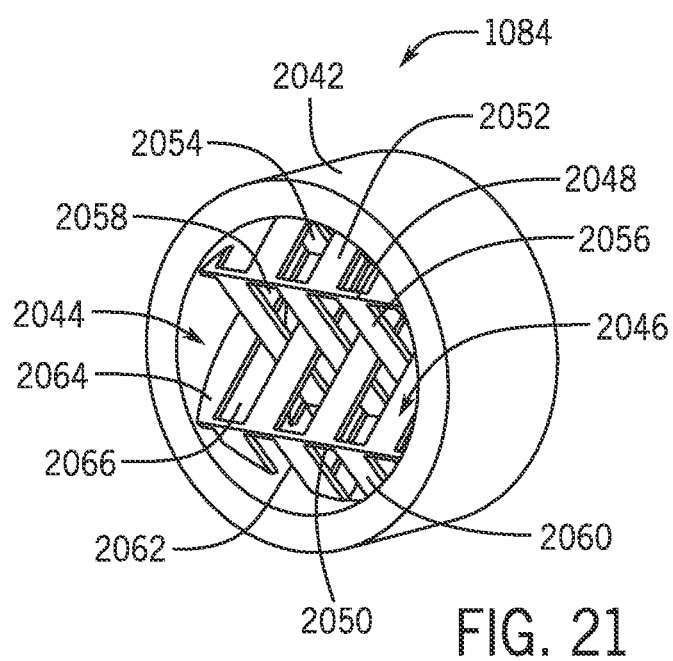
FIG. 21 is a perspective view of the mixer of FIGS. 19A-B, according to certain aspects of the present disclosure.

Referring to FIG. 21, the cap mixer 1084 is substantially cylindrical in shape and includes a cylindrical wall 2042 and an opening 2044 therethrough. A grate 2046 is disposed with the opening 2044 and coupled to the cylindrical wall 2042. The grate 2046 includes a first V-shaped member 2048 and a second V-shaped member 2050. The first V-shaped member 2048 includes a first plurality of slats 2052 on one leg of the "V" such that a first slit 2054 is disposed between each slat of the first plurality of slats 2052. The first V-shaped member 2048 also includes a second plurality of slats 2056 one the other leg of the "V" such that a second slit 2058 is disposed between each slat of the second plurality of slats 2056. Similarly, the second V-shaped member 2050 includes a third plurality of slats 2060 on one leg of the "V" such that a third slit 2062 is disposed between each slat of the third plurality of slats 2064. The second V-shaped member 2050 also includes a fourth plurality of slats 2064 on the other leg of "V" such that a fourth slit 2066 is disposed between each slat of the fourth plurality of slats 2064. The first V-shaped member 2048 and the second V-shaped member 2050 are arranged within the opening 2044 such that each slat of the second plurality of slats 2056 of the first V-shaped member 2048 is interposed with a corresponding fourth slit 2066 of the second V-shaped member 2050.

Figure 22:
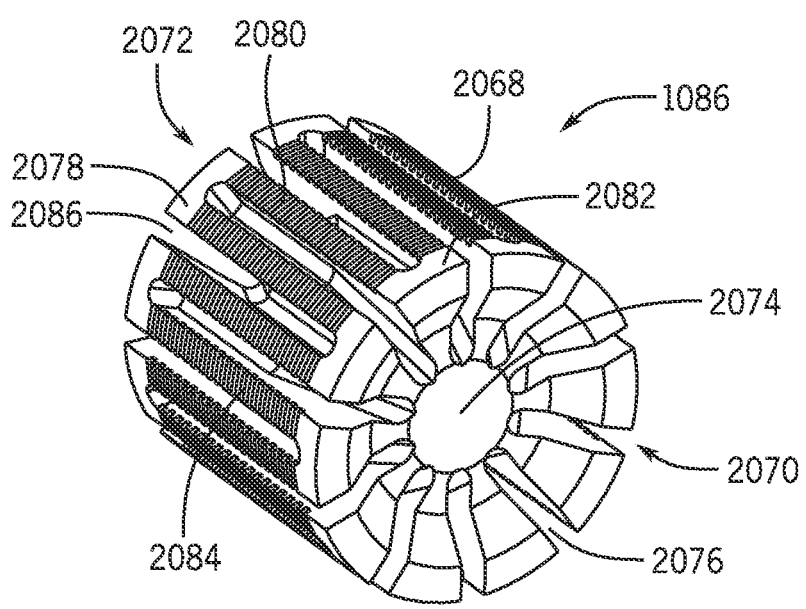
FIG. 22 is a perspective view of the flipper of FIGS. 19A-B, according to certain aspects of the present disclosure.

The layered cap flow 2038 passes through the grate 2046 of the cap mixer 1084 and is then received by the cap flipper 1086. With reference to FIG. 22, the cap flipper 1086 is configured to receive the layered cap flow 2038 from the cap mixer 1084 and to create texture to the layered cap flow 2038 for the wood-grained cap patterns 2818 on the exterior surfaces 2824 of the cap 2814. The cap flipper 1086 includes a cylindrical body 2068 disposed between a disperser receiver 2070 and an exit 2072. The disperser receiver 2070 faces the cap mixer 1084 and includes a centrally located first stop 2074. A first plurality of arteries 2076 extend radially outward from the first stop 2074 such that each artery of the first plurality of arteries 2076 is spaced evenly away from each other around a circumference of the first stop 2074. Each artery of the plurality of arteries 2076 extends axially along the cylindrical body 2068 from the disperser receiver 2070 and terminates before the exit 2072 at a first blocker 2078. A plurality of ribs 2080 is disposed around the cylindrical body 2068 such that each rib of the plurality of ribs 2080 extends between the first blocker 2078 and a second blocker 2082. Each rib of the plurality of ribs 2080 includes a plurality of ridges 2084 that extend radially outward therefrom. Moreover, a second plurality of arteries 2086 is disposed around the cylindrical body 2068 such that each artery of the second plurality of arteries 2086 extends axially along the cylindrical body 2068 from the second blocker 2082 and terminates at the exit 2072.

During production, the disperser receiver 2070 of the cap flipper 1086 receives the layered cap flow 2038 and disperses the layered cap flow 2038 through each artery of the first plurality of arteries 2076. The layered cap flow 2038 then travels out through the first plurality of arteries 2076 and over the plurality of ridges 2084 of the plurality of ribs 2080 to create texture in the layered cap flow 2038, which then flows into the second plurality of arteries 2086 and out through the exit 2072 into the cap flow reducer 1088. For example, the cap flipper 1086 receives the layered cap flow 2038 and flips the layered cap flow 2038 inside-out as it flows through the first and the second plurality of arteries 2076, 2086 and out the exit 2072.

Figure 23:
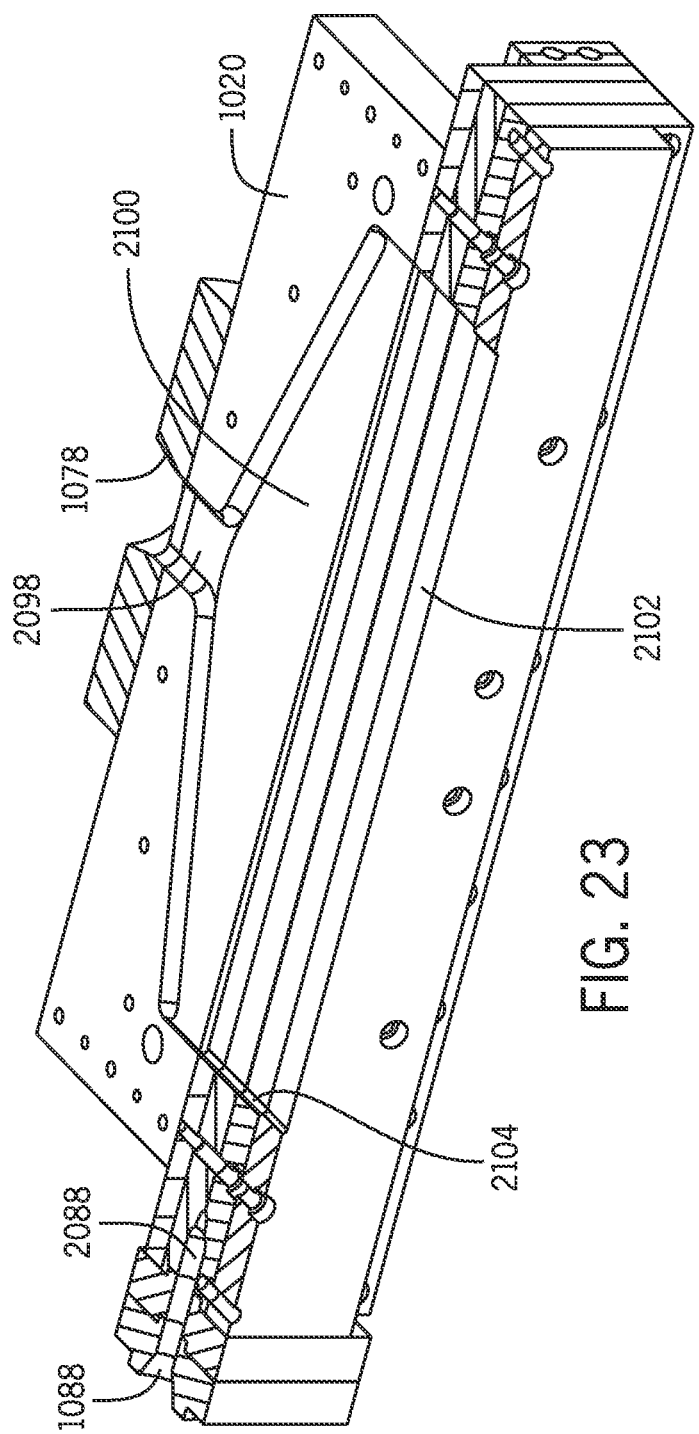
FIG. 23 is a perspective cross-sectional view of a die of the extrusion machine of FIG. 14 illustrating a 1-up configuration according to certain aspects of the present disclosure.
Figure 24:
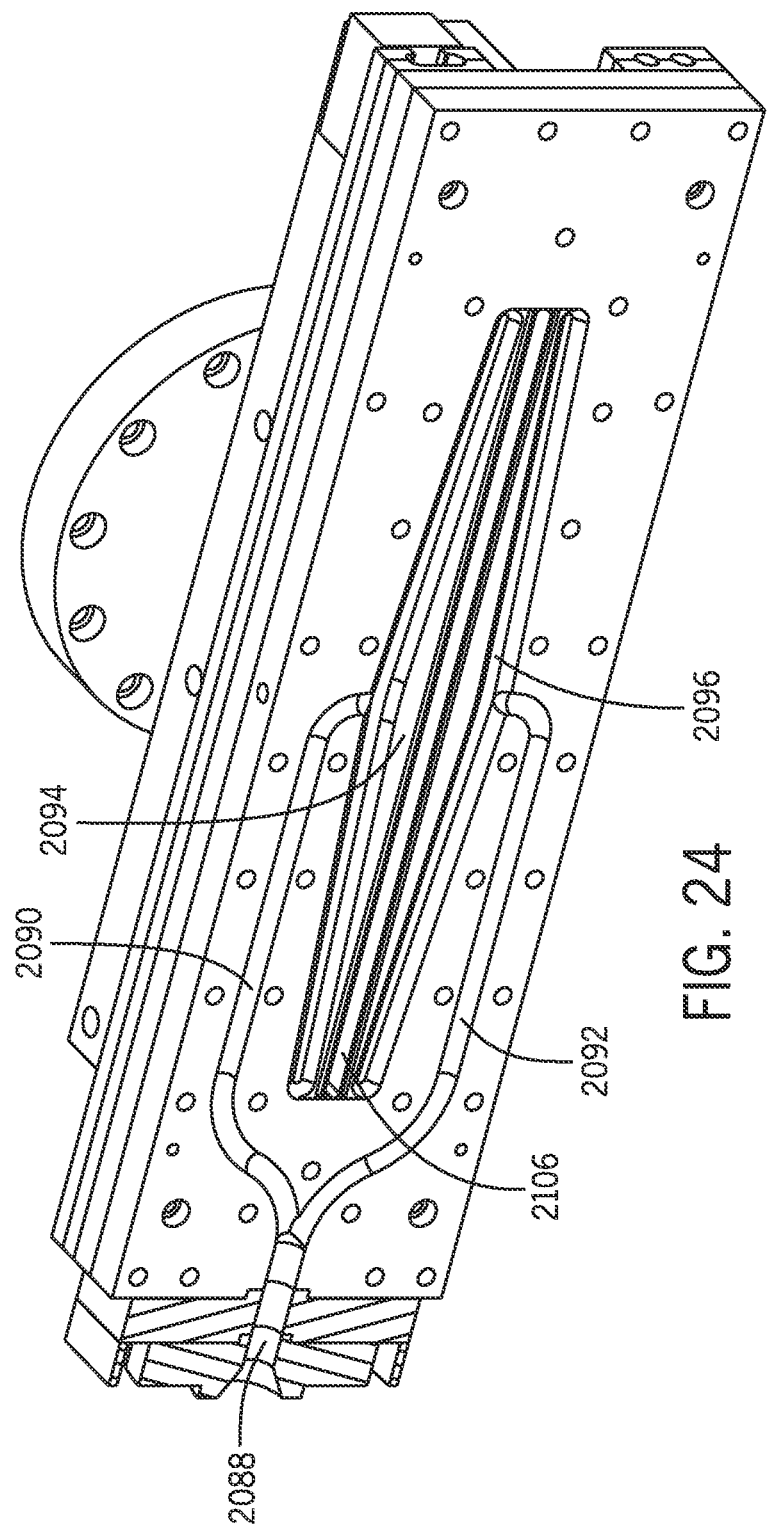
FIG. 24 is another perspective cross-sectional view of the die of FIG. 23, according to certain aspects of the present disclosure.

With reference to FIGS. 19A and 23-24, the cap flow reducer 1088 couples the housing 2040 of the cap flow divider 1082 to the die 1020. The cap flow reducer 1088 is in communication with the exit 2072 of the cap flipper 1086 and a first passage 2088 of the die 1020. The first passage 2088 splits, internally in the die 1020, into a first vein 2090 and second vein 2092. The first vein 2090 delivers a portion of the layered cap flow 2038 to a top cap reservoir 2094 while the second vein 2092 delivers a portion of the layered cap flow 2038 to a bottom cap reservoir 2096.

The die 1020 is also coupled to the core flow divider 1028. In certain aspects, the core flow expander 1030 couples the core flow divider 1028 to the die 1020. The die 1020 includes a second passage 2098 in communication with the core flow divider 1028 (via the core flow expander 1030 in some aspects) to receive the layered core flow 1076. The second passage 2098 delivers the layered core flow 1076 to a core reservoir 2100 for forming the desired shape of the core 2812. For example, the layered core flow 1076 enters the core reservoir 2100 and is dispersed within the core reservoir 2100 to form the core 2812. The core 2812 is further advanced to a fuser well 2102 that is in communication with the top cap reservoir 2094 and the bottom cap reservoir 2096 for fusing the layered cap flow 2038 onto the cohere surfaces 2822 of the core 2812 to form the capped polymer substrate 2810. The fuser well 2102 also includes side wells 2104 such that the layered cap flow 2038 flows from the top cap reservoir 2094 into the side wells 2104 for fusing the layered cap flow 2038 onto cohere sides 2826 of the cohere surfaces 2822 of the core 2812. The capped polymer substrate 2810 then exits an outlet 2106 of the die 1020 through an exit reducer 2107 and into a cooling bath 2108 (see FIG. 14). The exit reducer 2107 increases pressure to help the cap 2814 adhere to the cohere surfaces 2822 of the core 2822. Additionally, the exit reducer 2107 prevents voids between the cap 2814 and the core 2822. The cooling bath 2108 can be selected to be any desired temperature. For example, the temperature of the cooling bath 2108 can be 72 degrees Fahrenheit.

Figure 25:
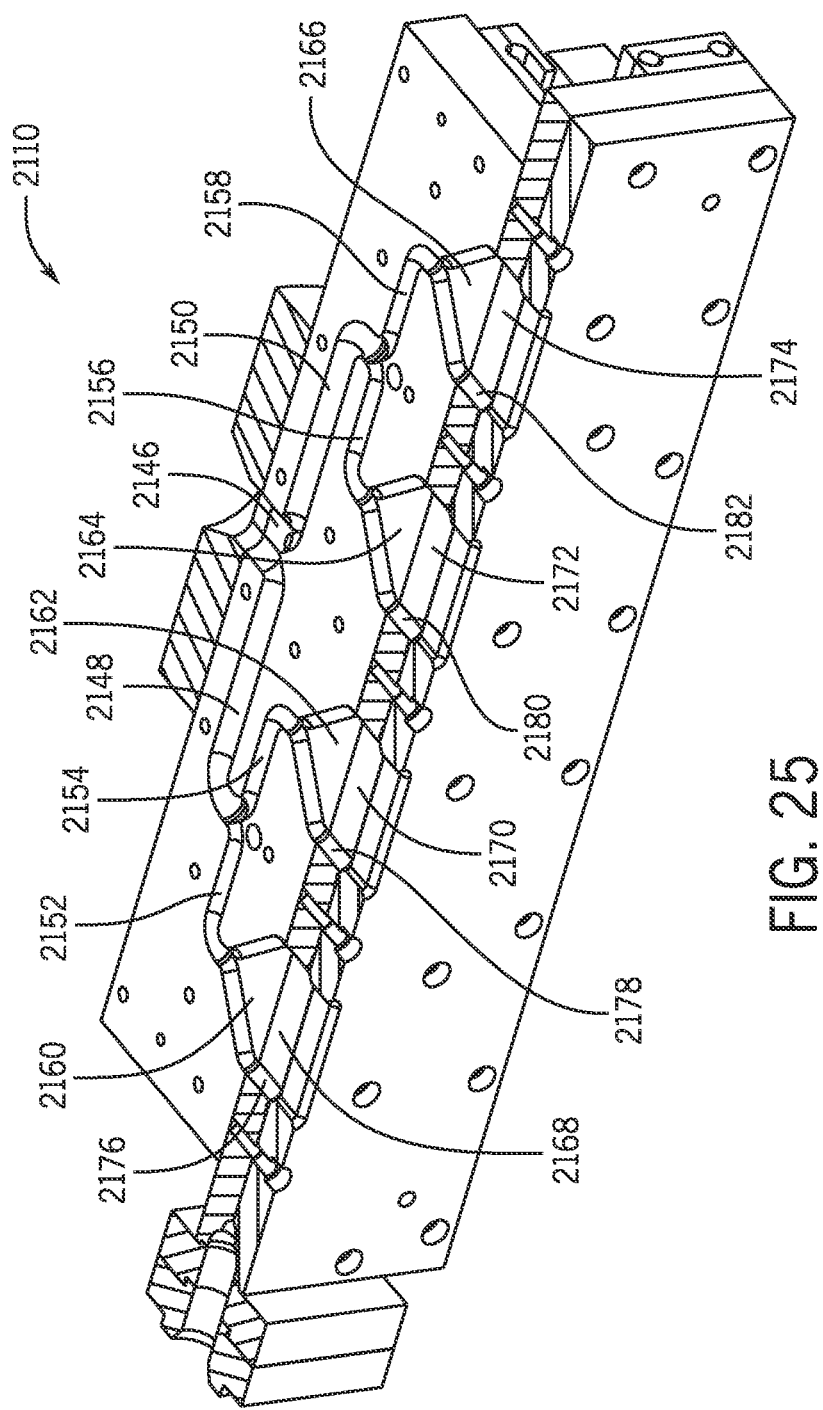
FIG. 25 is a perspective cross-sectional view of an alternative embodiment of the die of FIG. 23 illustrating a 4-up configuration, according to certain aspects of the present disclosure.
Figure 26:
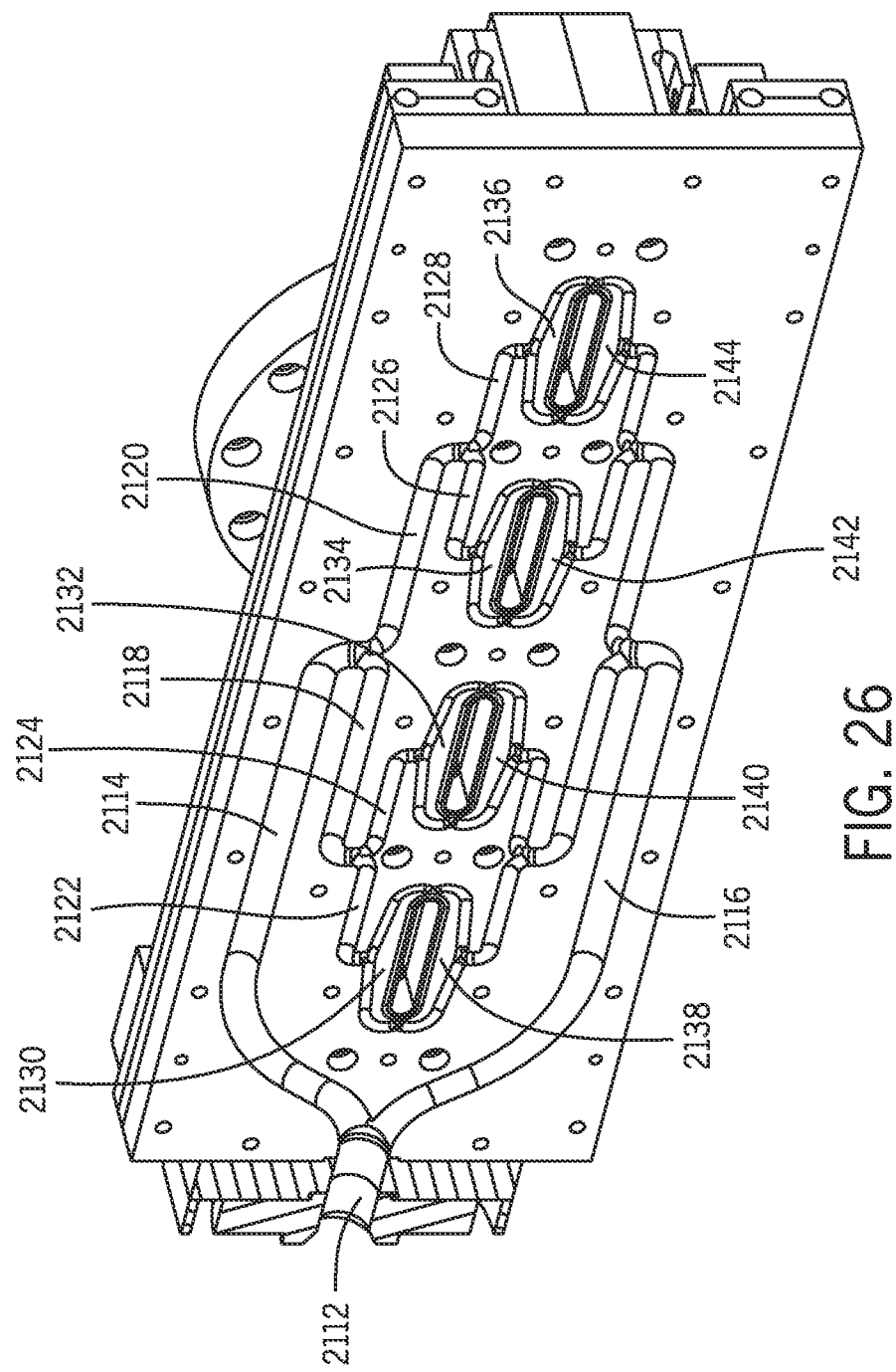
FIG. 26 is another perspective cross-sectional view of the die of FIG. 25 illustrating the 4-up configuration, according to certain aspects of the present disclosure.

Although the die 1020 is configured to produce a single capped polymer substrate 2810, it should be understood that the die 1020 can be configured to produce multiple numbers of the capped polymer substrate at the same time. For example, with reference to FIGS. 25 and 26, a 4-up die 2110 is illustrated. Similar to the die 1020, the 4-up die 2110 includes a first passage 2112 in communication with the cap flow reducer 1088 to receive the layered cap flow 2038 from the exit 2072 of the cap flipper 1086. The first passage 2112 splits, internally in the 4-up die 2110, into a first vein 2114 and a second vein 2116. Unlike the die 1020, however, the first vein 2114 of the 4-up die 2110 then splits into a third vein 2118 and a fourth vein 2120. The third vein 2118 splits into a fifth vein 2122 and a sixth vein 2124 while the fourth vein 2120 splits into a seventh vein 2126 and an eighth vein 2128. The fifth vein 2122 delivers a portion of the layered cap flow 2038 to a first top cap reservoir 2130, the sixth vein 2124 delivers a portion of the layered cap flow 2038 to a second top cap reservoir 2132, the seventh vein 2126 delivers a portion of the layered cap flow 2038 to a third top cap reservoir 2134, and the eighth vein 2128 delivers a portion of the layered cap flow 2038 to a fourth top cap reservoir 2136. In a similar manner, the second vein 2116 includes similar splits to deliver portions of the layered cap flow 2038 to a first bottom cap reservoir 2138, a second bottom cap reservoir 2140, a third bottom cap reservoir 2142, and a fourth bottom cap reservoir 2144.

The 4-up die 2110 is also coupled to the core flow divider 1028. In certain aspects, the core flow expander 1030 couples the core flow divider 1028 to the 4-up die 2110. Similar to the die 1020, the 4-up die 2110 includes a second passage 2146 in communication with the core flow divider 1028 (via the core flow expander 1030 in some aspects) to receive the layered core flow 1076. Unlike the die 1020, however, the second passage 2146 splits a ninth vein 2148 and a tenth vein 2150. The ninth vein 2148 splits into an eleventh vein 2152 and a twelfth vein 2154 while the tenth vein 2150 splits into a thirteenth vein 2156 and a fourteenth vein 2158. The eleventh vein 2152 delivers a portion of the layered core flow 1076 to a first core reservoir 2160, the twelfth vein 2154 delivers a portion of the layered core flow 1076 to a second core reservoir 2162, the thirteenth vein 2156 delivers a portion of the layered core flow 1076 to a third core reservoir 2164, and the fourteenth vein 2158 delivers a portion of the layered core flow 1076 to a fourth core reservoir 2166. The first through fourth core reservoirs 2160, 2162, 2164, 2166 receive portions of the layered core flow 1076 for each forming the desired shape of a corresponding core 2814. Each core 2814 is further advanced to corresponding first through fourth fuser wells 2168, 2170, 2172, 2174 that are correspondingly in communication with the first through fourth top cap reservoirs 2130, 2132, 2134, 2136 and the first through fourth bottom cap reservoirs 2138, 2140, 2142, 2144 for fusing corresponding layered cap flow 2038 onto corresponding cohere surfaces 2822 of corresponding core 2814 to form corresponding capped polymer substrate 2810. The first through fourth fuser wells 2168, 2170, 2172, 2174 include corresponding side wells 2176, 2178, 2180, 2182, respectively, such that corresponding layered cap flows 2038 flow from the corresponding top cap reservoirs 2130, 2132, 2134, 2136 into the corresponding side wells 2176, 2178, 2180, 2182 for fusing the corresponding layered cap flows 2038 onto the cohere sides 2826 of the cohere surfaces 2822 of each corresponding core 2812. One side well of the side wells 2176 is disposed on both sides of the first fuser well 2168. The side wells 2178, 2180, 2182 are similarly disposed on the second through fourth fuser wells 2170, 2172, 2174, respectively. Each of the four capped wood-grained substrates 2810 then exit corresponding outlets 2106 of the 4-up die 2110 through a reducer, such as, for example, the exit reducer 2107 and into the cooling bath 2108.

Referring back to FIG. 14, the extrusion machine 1000 includes a plurality of temperature sensors 2184 disposed at strategic locations throughout the extrusion machine 1000. The plurality of temperature sensors 2184 are strategically disposed on the extrusion machine 1000 at locations that are critical for temperatures to be monitored and maintained throughout the flow process. For example, there can be 6-8 zones associated with the core assembly 1016, the first extruder 1010, and the second extruder 1012. In certain aspects, each zone generally increases by 10 degrees Fahrenheit in the downstream direction. For example, zone 1 may be 370 degrees Fahrenheit and zone 2 may be 380 degrees Fahrenheit while zone 6 may be 420 degrees Fahrenheit. The plurality of sensors 2184 can be placed within these 6-8 zones to monitor the temperatures of certain components of the extrusion machine 1000. For example, sensors of the plurality of sensors 2184 may be disposed in zone 3 to monitor the core flow adapter 1026 and the core flow divider 1028 while another sensor of the plurality of sensors 2184 may be disposed in zone 6 to monitor the front of the die 1020.

Furthermore, sensors of the plurality of sensors 2184 can be placed on the first extruder 1010, the second extruder 1012, and the third extruder 1014 to monitor the melt temperatures of the first polymer 1022, the second polymer 1024, and the third polymer 1090, respectively. In certain aspects, the melt temperatures can be in a range approximately from 360 degrees Fahrenheit to 420 degrees Fahrenheit. Sensors of the plurality of sensors 2184 can also be placed to monitor the temperature of the second polymer 1024 as it flows to the core flow adapter 1026 and the cap flow adapter 1080. In certain aspects, the temperature of the second polymer 1024 flowing to the core flow adapter 1026 and the cap flow adapter 1080 can be in a range approximately from 360 degrees Fahrenheit to 390 degrees Fahrenheit. Sensors of the plurality of sensors 2184 can also be placed in the core flow divider 1028 and the cap flow divider 1082 to monitor the temperature here, which, in certain aspects, can be in a range of approximately from 360 degrees Fahrenheit to 420 degrees Fahrenheit. Sensors of the plurality of sensors 2184 can also be placed on the die 1020 to monitor the temperature of the die 1020, which, in certain aspects, can be approximately 400 degrees Fahrenheit.

Figure 27:
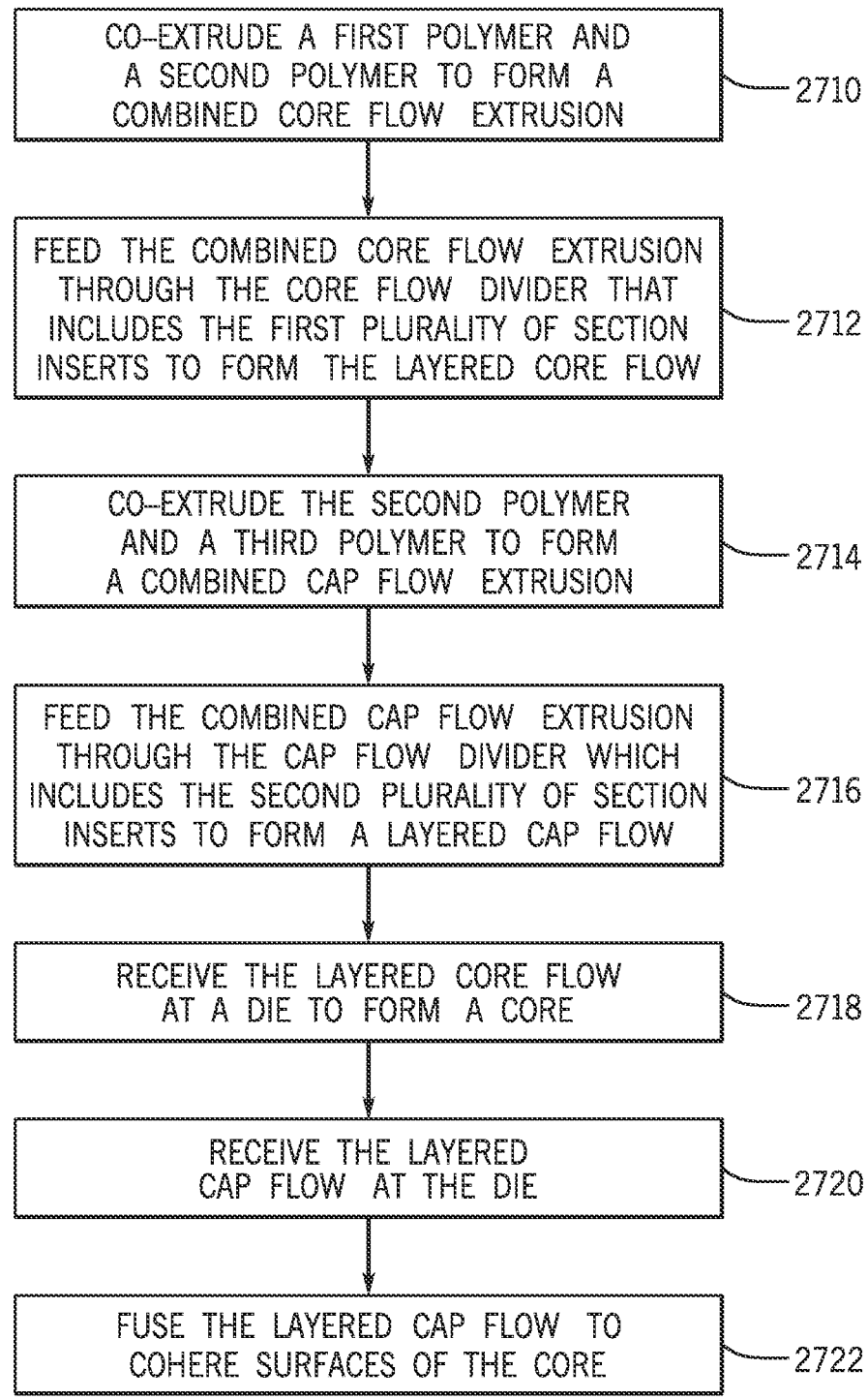
FIG. 27 illustrates an example process for producing a capped polymer substrate that simulates natural wood for manufacturing end products using the example extrusion machine of FIG. 14, according to certain aspects of the present disclosure.

FIG. 27 illustrates an example process 2700 for producing the capped polymer substrate 2810 for manufacturing end products using the example extrusion machine 1000 of FIG. 14. While FIG. 27 is described with reference to FIG. 14, it should be noted that the process steps of FIG. 27 can be performed by other aspects described throughout the disclosure.

As illustrated at block 2710, the process 2700 includes co-extruding the first polymer 1022 and the second polymer 1024 to form the combined core flow 1036 extrusion. The process 2700 also includes, as depicted in block 2712, feeding the combined core flow 1036 extrusion through the core flow divider 1028 that includes the first plurality of section inserts 1072 to form the layered core flow 1076. Each section insert of the first plurality of section inserts 1072 is predeterminedly inter-fitted with respect to each other to vary the first wood-grained pattern (i.e., the core wood-grained pattern 2816 into the layered core flow 1076, wherein the first wood-grained pattern includes a plurality of core grains 2828 oriented in different directions such that individual core grains of the plurality of grains 2828 are varied in thickness.

As illustrated at block 2714, the process 2700 includes co-extruding the second polymer 1024 and the third polymer 1090 to form the combined cap flow 1096 extrusion. The process 2700 also includes, as illustrated at block 2716, feeding the combined cap flow 1096 extrusion through the cap flow divider 1082, which includes the second plurality of section inserts 2034 to form the layered cap flow 2038. Each section insert of the second plurality of section inserts 2034 is predeterminedly inter-fitted with respect to each other to vary the second wood-grained pattern (i.e., the wood-grained cap patterns 2818) into the layered cap flow 2038.

The process 2700 also includes, as illustrated at block 2718, receiving the layered core flow 2038 at the die 1020 to form the core 2812. As illustrated at block 2720, the process 2700 includes receiving the layered cap flow 2038 at the die 1020. The process 2700 also includes, as illustrated at block 2722, fusing the layered cap flow 2038 to cohere surfaces 2822 of the core 2812.

Figure 28B:
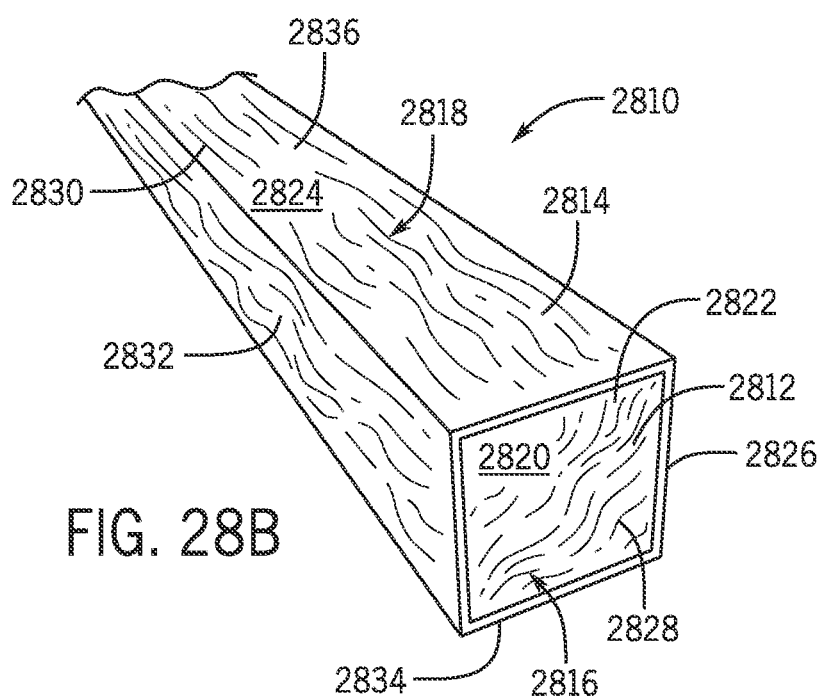

FIGS. 28A and 28B are example illustrations of various samples of the capped polymer substrate 2810 associated with the example process of FIG. 27. As discussed above, the capped polymer substrate 2810 produced by the extrusion machine 1000 includes the cap 2814 fused to the cohere surfaces 2822, including the cohere sides 2826, of the core 2812. The wood-grained core patterns 2816 extend throughout the core 2812 and are visible at the outer core surfaces 2820, as the cap 2814 is not fused to the outer core surfaces 2820. Core grains 2828 (formed of the second polymer 1024) of the wood-grained core patterns 2816 are generally thinner than the remaining layers (formed from the first polymer 1022) of the core 2812. Individual core grains of the core grains 2828 can vary in thickness. In certain aspects, the core grains 2828 mimic the organic wood-graining caused by rings of a tree.

The wood-grained cap patterns 2818 extend throughout the cap 2814 and are visible on the exterior surfaces 2824 of the cap 2814. In certain aspects, cap grains 2830 (formed of the second polymer 1024) of the wood-grained cap patterns 2818 are generally thinner than the remaining layers (formed from the third polymer 1090) of the cap 2814. Moreover, the wood-grained cap patterns 2818 include texture to simulate the feel of natural wood.

The extrusion machine 1000 can form the capped polymer substrate 2810 into boards used in the construction of various end products. While the capped polymer substrate 2810 that is formed into a board includes a generally rectangular cross-section, other cross-sectional profiles are within the scope of the disclosure. For example, the die 1020 or the 4-up die 2110 can be designed to produce a capped polymer substrate that includes a cross-sectional profile such as, but not limited to, circular, polygonal, or other unique cross-sectional profiles. Moreover, such cross-sectional profiles can also be created by post-processing techniques such as cutting or planing. For example, cutting or planing the capped polymer substrate 2810 can also expose other areas of the wood-grained core patterns 2816 by removing portions of the cap 2814.

The wood-grained core patterns 2816 in the resulting exemplary boards formed from the capped polymer substrate 2810 generally extend along the length of the board. In some aspects, a majority of core grains 2828, created by the layers of the second polymer 1024, extend along the length of the entire board. Likewise, the remaining portions of the core 2812 of the board, formed by the interspersed layers of the first polymer 1022, also generally extend along the length of the board. In certain aspects, a majority of the layers of the first polymer 1022 extend along the length of the entire board. This creates a substantially consistent pattern along the length of the board such that cuts at various point along the board will expose a substantially similar wood-grained core patterns 2816.

As discussed above, by selectively adjusting the orientation of the final section insert of the plurality of section inserts 1072, the core grains 2828 of the wood-grained core patterns 2816 can be oriented in various directions and orientations. For example, as illustrated in FIG. 28A, the core grains 2828 extend a width, between lateral sides 2832, of the capped polymer substrate 2810 (i.e., the board) and are orientated in a generally horizontal orientation. The interspersed layers of the first polymer 1022 and the second polymer 1024 are stacked from a bottom surface 2834 of the capped polymer substrate 2810 toward a top surface 2836 of the capped polymer substrate 2810. In another example, as illustrated in FIG. 28B, the core grains 2828 are orientated at an angle with to respect to the bottom surface 2834 of the capped polymer substrate 2810. As illustrated in these examples, the orientation of the core grains 2828 of the wood-grained core patterns 2816 can be formed in various orientations and extend along curvilinear paths across the width of the capped polymer substrate 2810. In certain aspects, a majority of the core grains 2828 extend substantially uninterrupted across the capped polymer substrate 2810 (i.e., the board) such that the core grains 2828 have minimal or no gaps.

Moreover, as also discussed above, by selectively adjusting the orientation of the final section insert of the plurality of section inserts 2034, the cap grains 2830 of the wood-grained cap patterns 2818 can be oriented in various directions and orientations. For example, the cap grains 2830 extend a length of the capped polymer substrate 2810 between the outer core surfaces 2820 and are generally orientated parallel to the lateral sides 2832. The interspersed layers of the second polymer 1024 and the third polymer 1090 are stacked between the lateral sides 2832 of the capped polymer substrate 2810. The texture of the cap 2814 simulates the feel of natural wood.

The capped polymer substrate 2810 can be used to fabricate various end products such as, but not limited to, decks, furniture, siding, playground equipment, the examples end products illustrated in FIGS. 12 and 13, and other end products.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A polymer substrate that simulates natural wood extending along a first direction, the polymer substrate having a first side and a second side spaced apart from the first side along a second direction different than the first direction, the first and the second sides defining a width of the substrate, the first and the second sides extending along the first direction, the substrate comprising:
   a first set of polymer layers extending along the first direction and containing a first colorant, a plurality of the first set of polymer layers being substantially continuous along the first direction;
   a second set of polymer layers extending along the first direction and containing a second colorant different than the first colorant, a plurality of the second set of polymer layers being substantially continuous along the first direction;
   the substrate extending between the first and the second sides and along the first direction, the substrate comprising a wood-grained pattern formed of the first set of polymer layers and the second set of polymer layers, wherein individual layers of the first and the second set of polymer layers are interspersed within the substrate to form the wood-grained pattern, wherein a plurality of individual layers of at least one of the first and the second sets of polymer layers extend along a substantially curvilinear path in the second direction originating proximate the first side and terminating proximate the second side; and
   a cross-section of the substrate exposing the wood-grained pattern.

2. The polymer substrate of claim 1, wherein the wood-grained pattern extends uninterrupted between the first end and the second end.

3. The polymer substrate of claim 1, wherein the wood-grained pattern includes a plurality of grains oriented in different directions such that individual grains of the plurality of grains vary in thickness with respect to a third direction that is perpendicular to the first direction and the second direction.

4. The polymer substrate of claim 1, wherein the plurality of individual layers of the first set of polymer layers extend along an uninterrupted curvilinear path in the second direction originating proximate the first side and terminating proximate the second side.

5. The polymer substrate of claim 1, wherein the substrate comprises texturized exterior surfaces.

6. The polymer substrate of claim 1, wherein the first and the second set of polymer layers are one of homopolymers, copolymers, virgin homopolymers, virgin copolymers, recycled homopolymers, and recycled copolymers.

7. The polymer substrate of claim 1, wherein the exposed portions of the wood-grained pattern form a burled grain pattern.

8. The polymer substrate of claim 1, wherein the first set of polymer layers are thinner than the layers of the second set of polymer layers.

9. The polymer substrate of claim 1, wherein the first and the second set of polymer layers include at least one of a UV inhibitor and a foaming agent.

10. A polymer substrate that simulates natural wood extending along a first direction, the polymer substrate having a first side and a second side spaced apart from the first side along a second direction different than the first direction, the first and the second sides defining a width of the substrate, the first and the second sides extending along the first direction, the substrate comprising:
   a first set of polymer layers extending along the first direction and containing a first colorant, a plurality of the first set of polymer layers being substantially continuous along the first direction;
   a second set of polymer layers extending along the first direction and containing a second colorant different than the first colorant, a plurality of the second set of polymer layers being substantially continuous along the first direction;
   the substrate extending between the first and the second sides and along the first direction, the substrate comprising a wood-grained pattern formed of the first set of polymer layers and the second set of polymer layers, wherein individual layers of the first and the second set of polymer layers are interspersed within the substrate to form the wood-grained pattern, wherein a plurality of individual layers of both the first and the second sets of polymer layers extend along a substantially curvilinear path in the second direction originating proximate the first side and terminating proximate the second side; and
   a cross-section of the substrate exposing the wood-grained pattern.

11. The polymer substrate of claim 10, wherein the wood-grained pattern extends uninterrupted between the first end and the second end.

12. The polymer substrate of claim 10, wherein the wood-grained pattern includes a plurality of grains oriented in different directions such that individual grains of the plurality of grains vary in thickness with respect to a third direction that is perpendicular to the first direction and the second direction.

13. The polymer substrate of claim 10, wherein the plurality of individual layers of the first set of polymer layers extend along an uninterrupted curvilinear path in the second direction originating proximate the first side and terminating proximate the second side.

14. The polymer substrate of claim 10, wherein the substrate comprises texturized exterior surfaces.

15. The polymer substrate of claim 10, wherein the first and the second set of polymer layers are one of homopolymers, copolymers, virgin homopolymers, virgin copolymers, recycled homopolymers, and recycled copolymers.

16. The polymer substrate of claim 10, wherein the exposed portions of the wood-grained pattern form a burled grain pattern.

17. The polymer substrate of claim 10, wherein the first set of polymer layers are thinner than the layers of the second set of polymer layers.

18. The polymer substrate of claim 10, wherein the first and the second set of polymer layers include at least one of a UV inhibitor and a foaming agent.

19. A simulated natural wood-grained polymer board extending along a first direction, having a first side and a second side spaced apart from the first side along a second direction different than the first direction, the first and the second sides defining a width of the board, the first and the second sides extending along the first direction, the board comprising:
   a first set of polymer layers extending along the first direction and containing a first colorant;
   a second set of polymer layers extending along the first direction and containing a second colorant different than the first colorant;
   the board extending between the first and the second sides and along the first direction, the board comprising a wood-grained pattern formed of the first set of polymer layers and the second set of polymer layers, wherein individual layers of the first and the second set of polymer layers are interspersed within the board to form the wood-grained pattern, wherein a plurality of individual layers of the first set of polymer layers extend along a substantially curvilinear path in the second direction originating proximate the first side and terminating proximate the second side; and
   a cross-section of the board exposing the wood-grained pattern.

20. The polymer substrate of claim 19, wherein at least one of the first and the second set of polymer layers are formed from high density polyethylene.

* * * * *